US012748260B1

(12) United States Patent
Wagner et al.

(10) Patent No.: US 12,748,260 B1
(45) Date of Patent: Sep. 29, 2026

(54) WAFER LEVEL OPTICAL ROUTING

(71) Applicant: Volantis Semiconductor, Inc., San Mateo, CA (US)

(72) Inventors: Horst W. Wagner, Goleta, CA (US); Roy Edward Meade, II, Bastrop, TX (US); Ashutosh Rao, White Plains, NY (US); Carlos I. Dorta Quiñones, Medford, MA (US)

(73) Assignee: Volantis Semiconductor, Inc., San Mateo, CA (US)

( * ) Notice: Subject to any disclaimer, the term of this patent is extended or adjusted under 35 U.S.C. 154(b) by 0 days.

(21) Appl. No.: 19/394,774

(22) Filed: Nov. 19, 2025

(51) Int. Cl.
*G02B 6/125* (2006.01)
*G02B 6/12* (2006.01)
*G02B 6/13* (2006.01)

(52) U.S. Cl.
CPC ......... *G02B 6/125* (2013.01); *G02B 6/12004* (2013.01); *G02B 6/13* (2013.01); *G02B 2006/12107* (2013.01); *G02B 2006/12145* (2013.01); *G02B 2006/12147* (2013.01)

(58) Field of Classification Search
CPC ........................................................ G02B 6/3672
See application file for complete search history.

(56) References Cited

U.S. PATENT DOCUMENTS

2023/0251423 A1* 8/2023 Pérez López .... H03K 19/17728
2024/0385395 A1* 11/2024 Chen .................... G02B 6/4214
2025/0172753 A1* 5/2025 Vert .................. G02B 6/12002

OTHER PUBLICATIONS

Jin et al., Seamless multi-reticle photonics, vol. 46, No. 12, Jun. 15, 2021, Optics Letters, pp. 2984-2987.
Xu et al., Low-loss, multi-reticle stitched SiN waveguides for 300mm wafer-level optical interconnects, OFC 2024 © Optica Publishing Group 2024, 3 pgs.

* cited by examiner

*Primary Examiner* — Lisa M Caputo
(74) *Attorney, Agent, or Firm* — Van Pelt, Yi & James LLP

(57) ABSTRACT

An optical system is described. The optical system includes multiple regions, each of which is defined by a reticle. Each region also includes a local waveguide. The local waveguide of a region is configurably stitched to a remote waveguide on other regions.

21 Claims, 13 Drawing Sheets

WAFER LEVEL OPTICAL ROUTING

BACKGROUND OF THE INVENTION

Wafer-scale computing is of interest for a number of applications, including machine learning. In a wafer-scale device, components in larger modules, including up to the devices formed across the wafer, function together to perform various tasks. To fabricate a wafer-scale device, regions of the wafer are exposed using reticles to form masks and the device built layer-by-layer. However, reticles are limited in size. For example, reticles may be approximately 26 mm×33 mm for fabricating some devices, but may be shrinking for advanced nodes. In contrast, wafers used in production are typically on the order of 200 mm or 300 mm in diameter. Because of limitations in the reticle size, larger modules utilize reticle stitching. For a given layer of the device, therefore, multiple exposures for adjacent regions are performed using one or more reticles.

Although stitching of reticles may be useful in fabricating wafer-scale devices, issues remain. For the wafer-scale device to function properly, components in one region of the wafer are desired to communicate with other components in other regions. Stated differently, components in different regions communicate across (i.e. are stitched across) reticle (or region) boundaries (or stitches). The interconnects used for such communication may be desired to reliably route multi-terabit signals and power/clock references across tens of centimeters. Thus, the technologies used may be limited and/or may be desired to meet high performance and reliability benchmarks. This communication may be achieved using interconnects, such as electrical or optical interconnects. However, adjacent regions (corresponding to adjacent reticle shots) may have different layouts, making uniform communication difficult. Stated differently, unique routing for interconnects crossing a given stitch may be desired. Although a unique reticle may be used for fabricating interconnects for every region, this solution is untenable because of the high mask and equipment costs as well as the time taken to develop the device. Accordingly, an improved technique for providing larger module devices, such as wafer-scale devices, is desired.

BRIEF DESCRIPTION OF THE DRAWINGS

Various embodiments of the invention are disclosed in the following detailed description and the accompanying drawings.

DETAILED DESCRIPTION

Figure 1A:
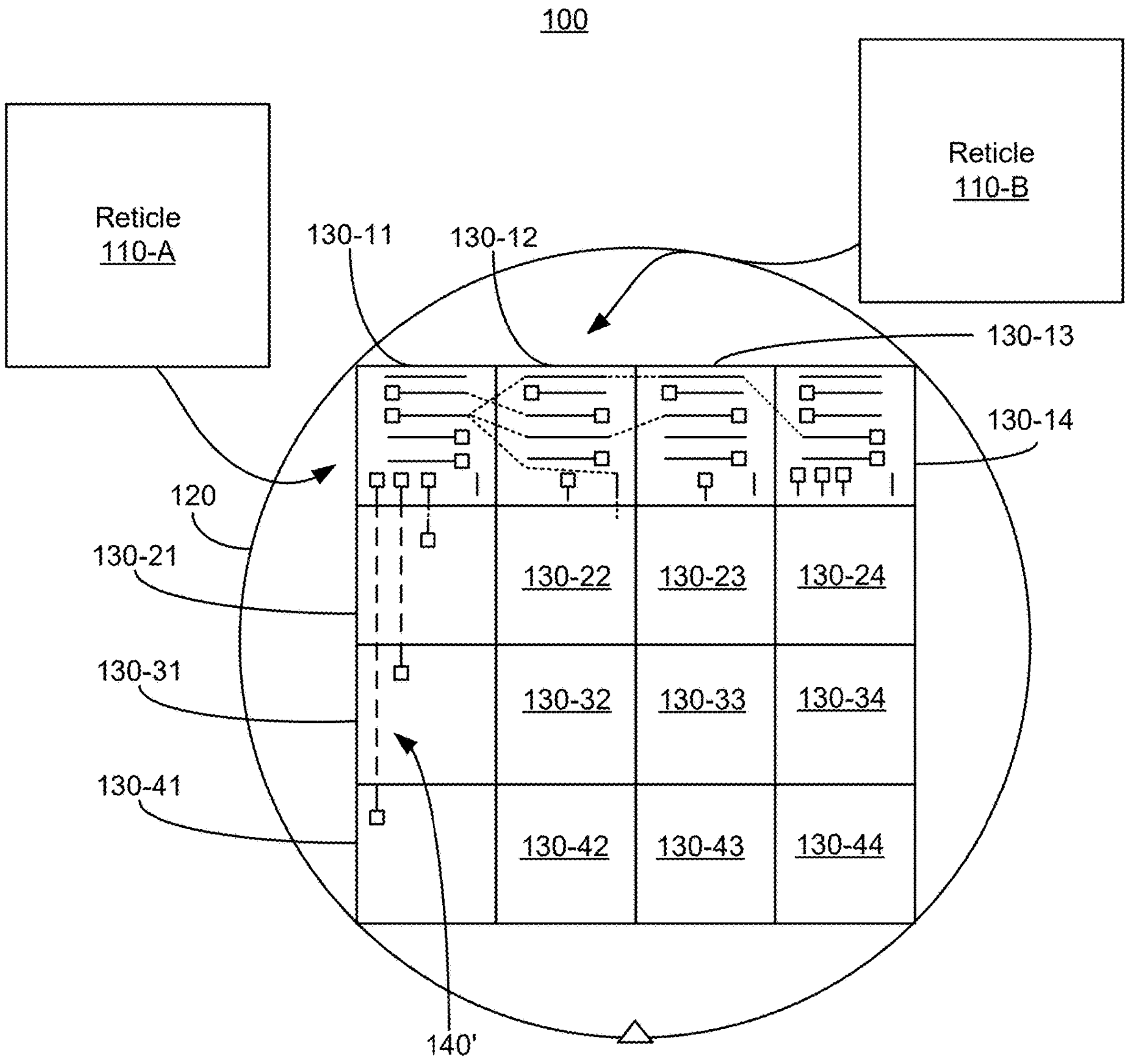
FIGS. 1A-1B depict an embodiment of a device having configurably stitched interconnects.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An optical system is described. The optical system includes multiple regions, each of which is defined by a reticle. Each region includes a local waveguide that is configurably stitched to a remote waveguide in another region. This stitching may involve active optical switching, waveguide path offsets, reticle offsets, jumpers, electrical switching, and/or the use of multiple reticles. In some embodiments, a region may include multiple local waveguides. The multiple local waveguides may be configurably stitched so that the region is optically connected to some or all other regions. In some embodiments, each region also has multiple ports. The local waveguides may be configurably stitched so that each port in a region connects optically to a port in some other regions or every other region.

In some embodiments, a region may include an optical input subsystem and/or an optical output subsystem coupled to the local waveguide. The input subsystem includes an optical input (e.g., an input grating) and a first optical switch, while the output subsystem includes an optical output (e.g., a grating and/or connection to a photodiode) and a second optical switch. In some embodiments, the optical switches may be Mach-Zehnder switches and/or optical micro-rings.

Each region may have multiple local waveguides, a first side, a second side opposite the first side, and a third side. The waveguide path offsets for the waveguides are such that a portion of each waveguide near the first side is closer to the third side than an opposite portion of each waveguide near the second side. The opposite portion of each waveguide in one region may align with the portion of each waveguide in another (e.g., adjoining) region. In some embodiments, waveguides may be coupled with ports.

In some embodiments, each region may have multiple local waveguides, a first side and a second side opposite the first side. The reticle used to form one region may be offset when forming another region, allowing for alignment of waveguide portions between regions. In some embodiments, electrical switches may be used to stitch local waveguides to remote waveguides in other regions. In some embodiments, a jumper may couple a waveguide segment to a port or another segment. The jumper may be a one-shot jumper (e.g., jumpers for multiple regions formed using a single shot). Some regions may be formed by different reticles.

An optical system is described. The optical system includes multiple regions, each of which is defined by a reticle. Each region includes local waveguides and ports. A local waveguide in a region is configurably stitched to a remote waveguide in another region such that each region is optically connected with at least one remaining region (e.g. each of a few remaining regions or each remaining region) and such that the ports in each region are optically connected with a port of at least one remaining region (e.g. each of a few remaining regions or each remaining region). This stitching may involve active optical switching, waveguide path offsets, reticle offsets, jumpers, electrical switching, and/or the use of multiple reticles.

A method for providing an optical system is described. The method includes providing multiple regions, each of which is defined by a reticle. Each region includes a local waveguide that is configurably stitched to a remote waveguide in another region. In some embodiments, providing the regions includes providing an optical input subsystem and/or an optical output subsystem coupled with the local waveguide. The optical input subsystem includes an optical input and a first optical switch. The optical output subsystem includes an optical output and a second optical switch. The first and second optical switches may be electrically controlled.

Each region may have multiple local waveguides, a first side, a second side opposite the first side, and a third side. Providing the regions may include providing waveguide path offsets for the waveguides such that a portion of each waveguide near the first side is closer to the third side than an opposite portion of each waveguide near the second side. The waveguide offsets may also be configured such that the opposite portion of each waveguide in one region may align with the portion of each waveguide in another (e.g., adjoining) region. In some embodiments, waveguides may be coupled with ports.

In some embodiments, each region may have multiple local waveguides, a first side and a second side opposite the first side. A portion of each local waveguide is proximate the first side, while an opposite portion of each local waveguide is proximate the second side. In such embodiments, providing the regions includes providing a first region using the reticle, offsetting the reticle to form an other region such that the opposite portion of each local waveguide in the region is aligned with the portion of each local waveguides in the other region.

In some embodiments, providing the regions may include providing electrical switches usable in stitching local waveguides to remote waveguides in other regions. In some embodiments, providing the regions may include providing ports and local waveguides in each of the regions using the reticle and providing a jumper for the region. The jumper may be a one-shot jumper. The jumper may couple a waveguide segment to a port or another segment. Some regions may be formed by different reticles and/or by rotating the reticle(s).

In some embodiments, configurably stitching the local waveguide may use active optical switching, waveguide path offsets, reticle offsets, jumpers, electrical switching, and/or multiple reticles. In some embodiments, a region may include multiple local waveguides.

Thus, the techniques described herein provide configurable interconnection between multiple regions or a large module, such as a wafer-scale device. The interconnects provided may be reliable, capable of handling the desired traffic over the desired distances (e.g., Tb/s signals and/or power over ten(s) of centimeters), cost effective (e.g. without undue wasting of mask material or requiring development of new, expensive equipment), manufacturable, and relatively rapidly deployable. Consequently, manufacturing and performance of a device using the optical systems described herein may be improved.

The embodiments described include various features. The features described herein may be combined in different configurations that are not explicitly shown. For example, active optical and/or electrical switches may be combined with the use of rotated reticles, configurable connections formed by the layout of the mask, and/or jumpers. The embodiments are described in the context of optical interconnects (e.g., waveguides). However, one of ordinary skill in the art will recognize that other interconnects, such as electrical interconnects, may be used in some embodiments. Wafer-scale devices are primarily described. The techniques described may be used with large modules (e.g. modules including multiple regions having at least one stitch between regions). For example, the techniques may be used with a large module having a large number of regions, but which may include fewer regions than are fabricated on a particular wafer. In some embodiments, the wafer-scale/large module device may take the form of an interposer used in providing connections between regions of another device, such as a graphics processing unit (GPU) or hardware accelerator, to which the interposer is connected. In some embodiments, the devices described may be part of a circuit including other components which are not described. For example, the regions, interconnects (e.g., waveguides), ports, and/or other components described may be part of a GPU or hardware accelerator.

Figure 1B:
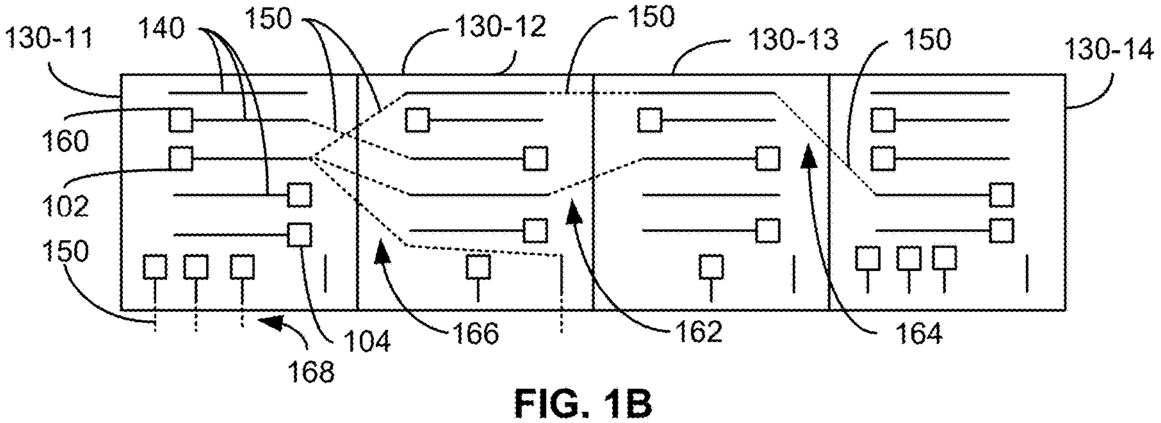

FIGS. 1A-1B depict an embodiment of optical system 100 having configurably stitched interconnects as well as the reticles 110-A and 110-B (collectively or generically reticle(s) 110) used in forming optical system 100. For clarity, not all portions of optical system 100 are shown. Thus, other components may be present. FIGS. 1A-1B are not to scale. Optical system 100 may be capable of providing communication between multiple regions, each of which may be formed using a reticle (e.g., reticles 110 and/or other analogous reticles). Thus, optical system 100 provides communication between regions formed using different exposures. In some embodiments, optical system 100 is an interposer. An interposer may be considered to be a layer that sits below or between multiple active dies (chiplets). An active die may include devices containing semiconductor and/or optoelectronic devices such as MOSFETs, BJTs, lasers, modulators, and/or other analogous devices. An interposer may also be above the package substrate or substrates. In some embodiments, this layer acts as an intermediate platform that provides high-density electrical interconnections among the active dies. The interposer may also connect the active dies to the underlying package substrate. Thus, the interposer may provide efficient signal routing, power distribution, and mechanical support, facilitating dense integration of heterogeneous components within advanced microelectronic packages such as CoWoS. In some embodiments, the interposer is passive and does not contain active devices. The interposer may incorporate through-silicon vias (TSVs) and redistribution layers (RDLs) to manage the interconnections between the chiplets and the underlying package substrate. In some embodiments the interposer has semiconducting devices. In some embodiments, the interposer may have other location(s), other structure(s), and/or provide other and/or additional functions.

Optical system 100 may be integrated with another device, such as graphics processing unit(s) (GPU(s)), hardware accelerator(s), or large scale devices. Optical system 100 provides communication across multiple regions for a large module (e.g., a device including multiple regions). To do so, optical system 100 provides connectivity across multiple regions 130 of optical system 100. For example, optical system 100 may provide communication between regions for wafer-scale devices. Consequently, optical system 100 and other optical systems described herein are discussed in the context of wafer-scale devices and communication. However, optical system 100 and other optical systems described herein may be used in connection with multiple-region devices that occupy only a portion of a wafer. In some embodiments, optical system 100 provides communication between each region and all other regions of the corresponding devices. To do so, optical system 100 provides communication between each region 130 and all other regions 130 of optical system 100.

Optical system 100 may be formed on a wafer 120. In some embodiments, wafer 120 is a silicon wafer. Other wafers (e.g., other semiconductor wafers or other appropriate substrates) may be used in some embodiments. Optical system 100 includes multiple regions 130-11 through 130-44 (collectively or generically region(s) 130). Although sixteen regions 130 are shown, another number may be present.

Each region 130 includes one or more local waveguides 140 (indicated by solid lines) and may include one or more ports 102 and 104 (indicated by squares). For simplicity, only some local waveguides 140 and ports 102 and 104 are labeled. In addition, only some local waveguides 140 and ports 102 and 104 in some regions 130 are shown. Local waveguides 140 are termed local because each may reside a particular region 130. Although described as a single waveguide, a local waveguide 140 may actually include multiple waveguides. Configurable connections 150 stitch local waveguides 140 in one region 130 to local waveguide(s) 140 (and/or ports 102 and/or 104) in other regions. Optical system 100 thus uses optical interconnects to communicate between regions 130. Each optical interconnect includes local waveguide(s) 140 and may include configurable connection(s) 150. In some embodiments, local waveguides 140 may be SiN waveguides. However, other optical material(s) may be used in other embodiments. For example, electro-optic materials may be used for some or all of local waveguides 140. In alternate embodiments, electrical interconnects (e.g. transmission lines) may be used in addition to or in lieu of local waveguides 140.

Ports 102 may be considered input ports, while ports 104 may be considered output ports. In some embodiments, input and output functions of ports 102 and 104 may be interchangeable. Ports 102 and 104 may include optical input/output components such as gratings and/or coupling to devices such as photodiodes. Ports 102 and/or 104 may receive optical signals from and/or provide optical signals to drivers that translate between the optical signals and electrical signals in the device with which optical system 100 is used. Input ports 102 may be aligned with a light source, such as a vertical cavity surface emitting laser (VCSEL) (not shown). In such embodiments, optical system 100 may also include modulators to modulate the signal. In some such embodiments, the output VCSEL may be modulated.

Optical system 100 is described primarily in the context of communication across rows (e.g. the first row including regions 130-11, 130-12, 130-13, and 130-14). However, communication across columns and/or in other directions is possible. For example, long range communication along a column may be facilitated by local waveguides 140' (indicated by dashed lines) in combination with configurable connections across the stitches between regions 130-11, 130-21, 130-31, and 130-41. Communication in other directions via waveguides is also possible, but is not shown for clarity. For example, waveguides may allow for communication diagonally between regions 130-11 and 130-22.

Reticles, such as reticles 110-A and 110-B, are used in fabricating each region 130. Regions 130 have different configurations and may have different connections across the stitches, or boundaries, between the regions. Only two reticles 110-A and 110-B are used in this embodiment. For example, regions 130-11 and 130-14 may be fabricated using reticle 110-A, while regions 130-12 and 130-13 are fabricated using reticle 110-B. In some embodiments, a different number of reticles 110 may be used. However, a unique reticle need not be used for every region 130 while providing different configurations of possible interconnect paths between regions 130. Thus, the use of fewer reticles 110 than there are regions 130 is possible. Consequently, manufacturing optical system 100 may be simplified by utilizing fewer reticles 130 while providing a larger number of configurations for communication between regions 130.

Optical system 100 also includes configurable connections 150 between regions 130. Configurable connections 150 are indicated by dotted lines. For clarity, only some configurable connections 140 are labeled and/or shown. Configurable connections 150 stitch local waveguide(s) 140 in one region 130 to local waveguide(s) 140 in one or more other regions 130. Thus, communication may occur between different regions 130, across a region boundary (or stitch) through configurable connections 150.

Configurable connections 150 may be or include physical connections (e.g., passive connections) selected and formed during fabrication. Such connections may be static, providing the same function throughout use of optical system 100. In some embodiments, configurable connections 150 include or consist of active connections formed during fabrication but that may be selectively energized during use of optical system 100. In some embodiments, configurable connections 150 may include both connections selected and formed during fabrication and active connections energized during use of optical system 100. For example, configurable connections 150 selected during fabrication may include: jumpers connecting particular components (e.g., local waveguides 140 and/or ports 102 and 104), alignment of particular local waveguides 140 in adjacent regions 130 that is provided by offsetting of reticle(s) 110-A and/or 110-B during fabrication, waveguide path offsets provided by reticle(s) 110 and configured to align local waveguides 140 in adjacent regions, alignment of certain local waveguides 140 in adjacent regions 130 achieved during fabrication by rotation of reticle(s) 110-A and/or 110-B, or some combination thereof. In another example, active configurable connections 150 may include optical switches and/or electrical switches that may be selectively activated or deactivated during use of optical system 100. In some embodiments, configurable connections 150 may be a mixture of both connections selected during fabrication and active connections. Other types of configurable connections may be used in some embodiments. In addition, configurable connections 150 and/or local waveguides 140 may be depicted as having sharp bends. However, in some embodiments, curves are used to change the direction of the optical signal. For example, Euler or Bezier bends may be used in local waveguides 140 and/or configurable connections 150.

Through the use of configurable connections 150 and local waveguides 140, communication between regions 130 may be facilitated. For example, local waveguides 140 may be configurably stitched so that a region 130 is optically connected one to or more other regions 130. In some embodiments, each region 130 is optically connected to all other regions. Consequently, data, power, or other signals may be input at a port 102 at the desired location in the desired region 130 and carried to the desired output port 104 at the desired location in another region 130. For example, a signal input at port 102 in region 130-11 may be transmitted via local waveguides 140 and configurable connections 150 to an output port 104 in regions 130-12 (on path/interconnect 160), 130-13 (on path/interconnect 162), or 130-14 (on path/interconnect 164). Similar paths 166 and 168 exist via local waveguides 140, 140' and/or configurable connections 150 between ports 102 in region 130-11 and regions 130-21 and 130-22. Thus, local waveguides 140 may be configurably stitched using connections 150 so that ports 102 and/or 104 in a region 130 connect optically to a port 104 and/or 102 in other region(s) 130 (including up to all other regions 130).

Optical system 100 facilitates the use of large modules, such as wafer-scale devices. Local waveguides 140 in combination with configurable connections 150 are capable of carrying the desired signals (e.g. up to Tb/s in some embodiments) across multiple regions 130 with the desired reliability and/or signal losses over the requisite distances. Thus, signal integrity and low losses may be preserved over distances across wafer-scale optical system 100 and the corresponding wafer-scale device (not shown) with which optical system 100 may be used. For example, local waveguides 140 may achieve transmission of signals with losses of <0.2 dB/cm and <0.01 dB per stitch (e.g., per boundary crossing between regions 130). Thus, optical system 100 may function as an interposer for a wafer-scale device or as a communication layer(s) within the wafer-scale device. Through the use of configurable connections 150 and local waveguides 140, an optical interconnect fabric may be provided in optical system 100 without requiring unique reticles for each region 130. Manufacturability may be improved and costs reduced. In some embodiments, optical system 100 may be fabricated using existing manufacturing techniques. Thus, yield may not be adversely affected by the use of optical system 100. Consequently, performance and manufacturability of wafer-scale devices may be improved.

Figure 2A:
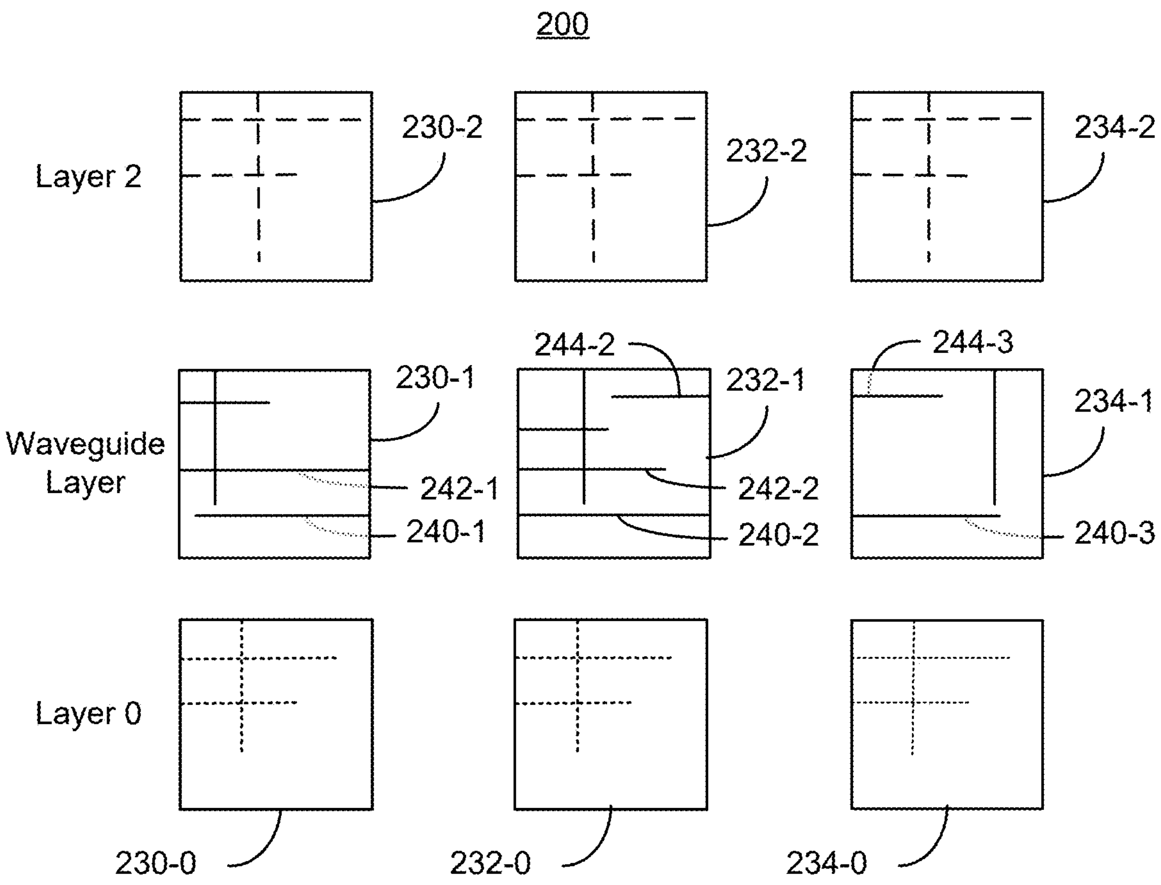
FIGS. 2A-2E depict embodiments of devices having configurably stitched interconnects using multiple reticles and/or reticle rotations.
Figure 2B:
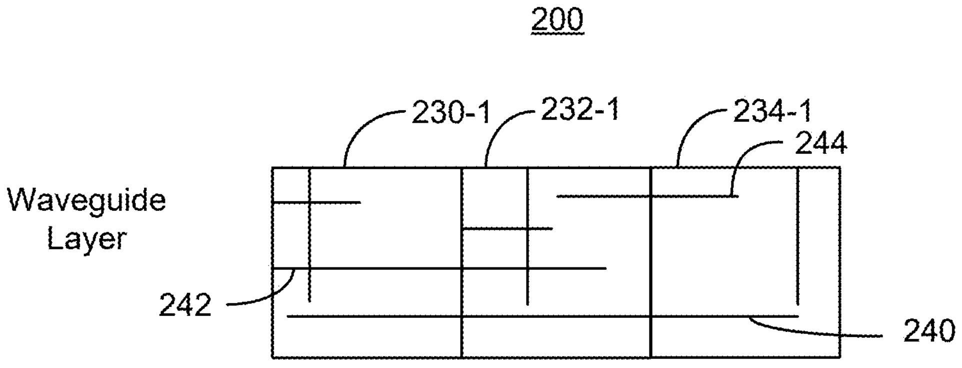
Figure 2C:
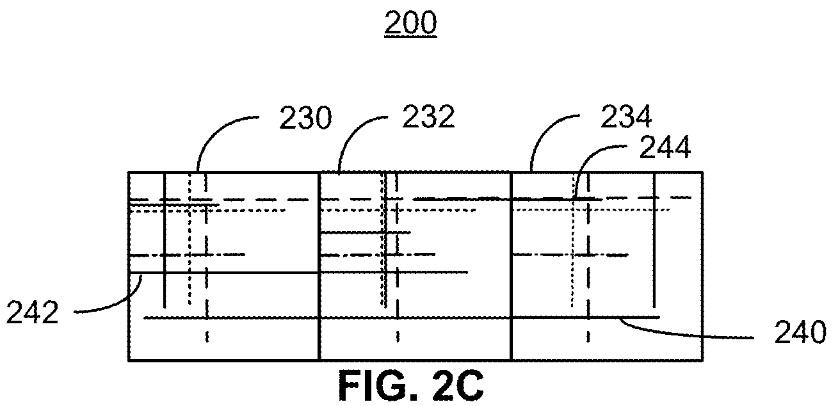
Figure 2D:
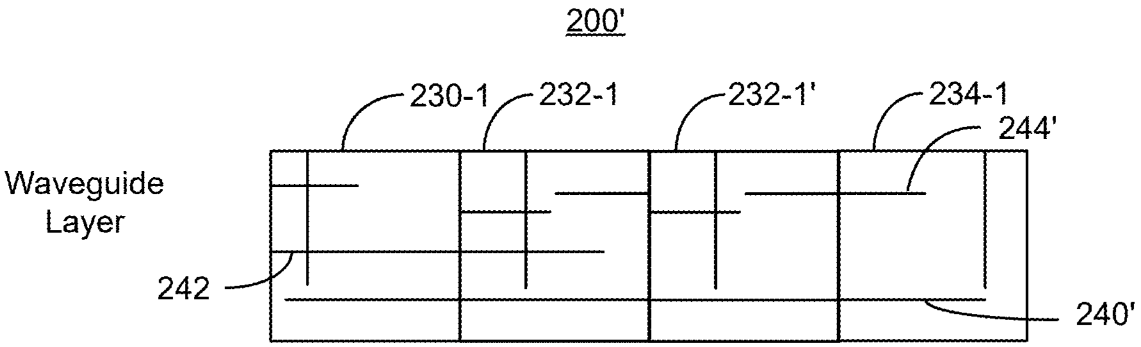
Figure 2E:
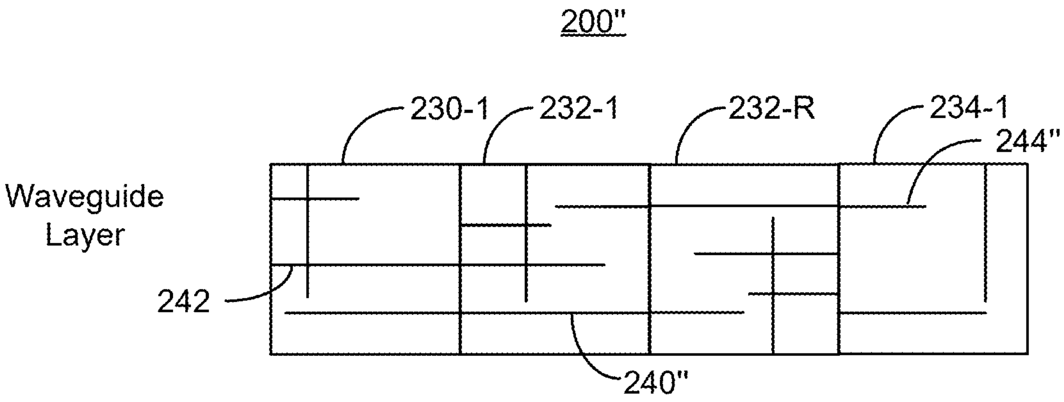

FIGS. 2A-2E depict embodiments of optical systems 200, 200' and 200" having configurably stitched interconnects formed using multiple reticles and/or reticle rotations. More specifically, FIGS. 2A-2C depict optical system 200, while FIGS. 2D-2E depict optical systems 200' and 200". For clarity, not all portions of optical systems 200, 200' and 200" are shown. FIGS. 2A-2E are not to scale. Optical systems 200, 200' and 200" may be capable of providing communication between multiple regions, each of which may be formed using a reticle. Thus, optical systems 200, 200' and 200" provide communication between regions formed using different exposures. In some embodiments, optical systems 200, 200' and 200" are interposers. Thus, optical systems 200, 200' and 200' may be integrated with another device, such as GPU(s), hardware accelerator(s), or other large scale devices. Optical systems 200, 200' and 200' may provide communication across multiple regions for a large module (e.g., a device including multiple regions). To do so, optical systems 200, 200' and 200" provide connectivity across multiple regions of optical systems 200, 200' and 200", respectively. For example, optical systems 200, 200' and 200" may provide communication between regions for wafer-scale devices. Thus, optical systems 200, 200' and 200" are analogous to optical system 100. Consequently, analogous components have similar labels. For example, optical system 200 includes regions 230, 232, and 234 that are analogous to regions 130 of optical system 100. Similarly, optical system 200 includes local waveguides analogous to local waveguides 140, of which only some, 240-1, 240-2, 240-3, 242-1, 242-2, 242-3, 244-2, and 244-3 are labeled. Although described as a single waveguide, a local waveguide in optical system 200, 200', and/or 200" may include multiple waveguides.

Referring to FIG. 2A is an exploded view of optical system 200 that separates regions and layers. Thus, layer 0 includes regions 230-0, 232-0, and 234-0. Dotted lines in layer 0 indicate structures in layer 0. The waveguide layer includes regions 230-1, 232-1, and 234-1. Layer 2 includes regions 230-2, 232-2, and 234-2. Dashed lines in layer 2 indicated structures in layer 2. For example, layer 2 may be a metal layer, while layer 0 may be a shallow trench isolation layer or another metal layer. Layer 0 and layer 2 may be other layers and optical system 200 may include other and/or additional layers. Regions 230-0, 230-1, and 230-2 of the layers form region 230. Regions 232-0, 232-1, and 232-2 of the layers form region 232. Regions 234-0, 234-1, and 234-2 of the layers form region 234. In the embodiment shown, each region 230-0, 232-0, and 234-0 for layer 0 is the same. Similarly, each region 230-2, 232-2, and 234-2 for layer 2 is the same. However, regions 230-1, 232-1, and 234-1 for the waveguide layer differ. This is because the waveguide layer is desired to provide communication specific to regions 230-1, 232-1, and 234-1 and the corresponding regions of the device with which the waveguide layer is used. The waveguide layer includes local waveguides 240-1 and 242-1 in region 230-1, local waveguides 240-2 and 242-2 in region 230-2, and local waveguides 240-3 in region 230-3. For clarity, no ports are shown. However, ports and/or other components may be present.

FIG. 2B depicts the waveguide layer of optical system 200. FIG. 2C depicts layer 0, the waveguide layer, and layer 1 overlaid to form regions 230, 232, and 234. Local waveguides 240-1, 240-2, and 240-3 thus form waveguide 240. Local waveguides 242-1 and 242-2 form waveguide 242. Local waveguides 244-2 and 244-3 form waveguide 244. Thus, waveguides 240, 242, and 244 form optical interconnects between regions 230 and 234, regions 230 and 232, and regions 232 and 234, respectively. Configurable connections between local waveguides 240-1, 240-2, and 240-3, between local waveguides 242-1 and 242-2, and between local waveguides 244-2 and 244-3 allow for the formation of waveguides (e.g., optical interconnects) 240, 242, and 244, respectively. These configurable connections are formed by the layout and alignment of regions 230-1, 232-1, and 234-1, which align the desired local waveguides of regions 232-1, 232-1, and 234-1.

FIG. 2D depicts the waveguide layer of optical system 200'. Optical system 200' is analogous to optical system 200. Thus, optical system 200' includes regions 230-1, 232-1, and 234-1 in the waveguide layer. However, optical system 200' includes an additional region 232-1'. Region 232-1' is formed using the same reticle as region 232-1. Thus, waveguides 240', 242, and 244' are formed by the local waveguides of each region 230-1, 232-1, 232-1', and 234-1 in combination with the configurable connections formed by the layouts and alignment of regions 230-1, 232-1, 232-1', and 234-1. Optical system 200' thus includes waveguide 240', which extends from region 230-1, through regions 232-1 and 232-1', and to region 234-1. Waveguide 242 still extends between regions 230-1 and 232-1. Waveguide 244' extends between regions 232-1' and 234-1.

FIG. 2E depicts the waveguide layer of optical system 200". Optical system 200" is analogous to optical systems 200 and 200'. Thus, optical system 200" includes regions 230-1, 232-1, and 234-1 in the waveguide layer. However, optical system 200" includes an additional region 232-R. Region 232-R is formed using the same reticle as region 232-1, but rotated one hundred and eighty degrees. Thus, waveguides 240", 242, and 244" are formed by the local waveguides of each region 230-1, 232-1, 232-R, and 234-1 in combination with the configurable connections formed by the layouts and alignment of regions 230-1, 232-1, 232-R, and 234-1. Optical system 200" thus includes waveguide 240", which extends from region 230-1, through region 232-1, and to region 232-R. Waveguide 242 still extends between regions 230-1 and 232-1. Waveguide 244' extends from regions 232-1, through region 232-R and to region 234-1. Thus, optical system 200" has a different connectivity across stitches than optical system 200'.

Optical systems 200, 200', and 200" may share the benefits of optical system 100. Optical systems 200, 200', and 200" facilitate the use of large modules, such as wafer-scale devices. Local waveguides in each region 230, 232, and 234 in combination with configurable connections formed by the layout, alignment, and orientation of reticles used in forming regions 230-1, 232-1, 232-1', 232-R, and 234-1 provide varying connectivity between regions 230-1, 232-1, 232-1', 232-R, and 234-1. Further, the waveguides 240, 242, 244, 240', 244', 240", and 244" are capable of carrying the desired signals across multiple regions and for relatively long distances with the desired reliability and/or signal losses. Thus, signal integrity and low losses may be preserved over distances across wafer-scale optical systems 200, 200', and/or 200" as well as the corresponding wafer-scale device (not shown) with which optical systems 200, 200', and/or 200" may be used. Thus, an optical interconnect fabric may be provided in optical systems 200, 200', and/or 200" without requiring unique reticles for each region 230-1, 232-1, 232-1', 232-R, and 234-1. For example, a single reticle or a single set of reticles might be used. Manufacturability may be improved and costs reduced. In some embodiments, optical systems 200, 200', and 200" may be fabricated using existing manufacturing techniques. Thus, yield may not be adversely affected by the use of optical system 200, 200', and/or 200". Consequently, performance and manufacturability of wafer-scale devices may be improved.

Figure 3A:
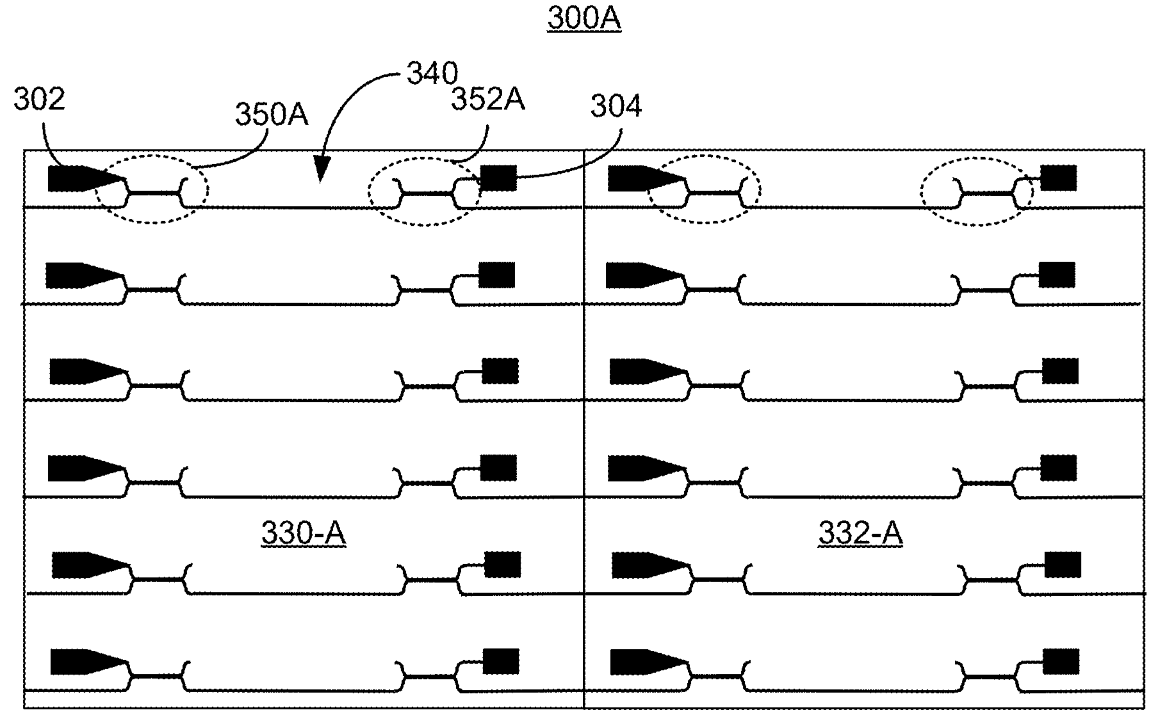
FIGS. 3A-3C depict embodiments of devices having interconnects configurably stitched using active optical switches.
Figure 3B:
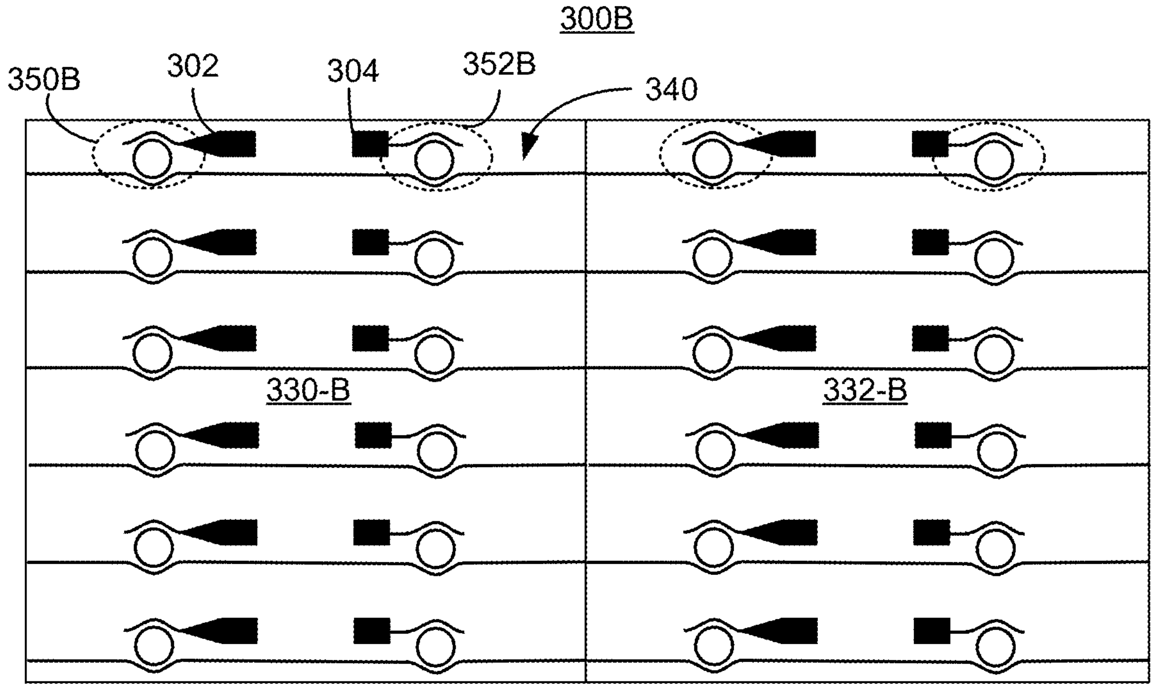
Figure 3C:
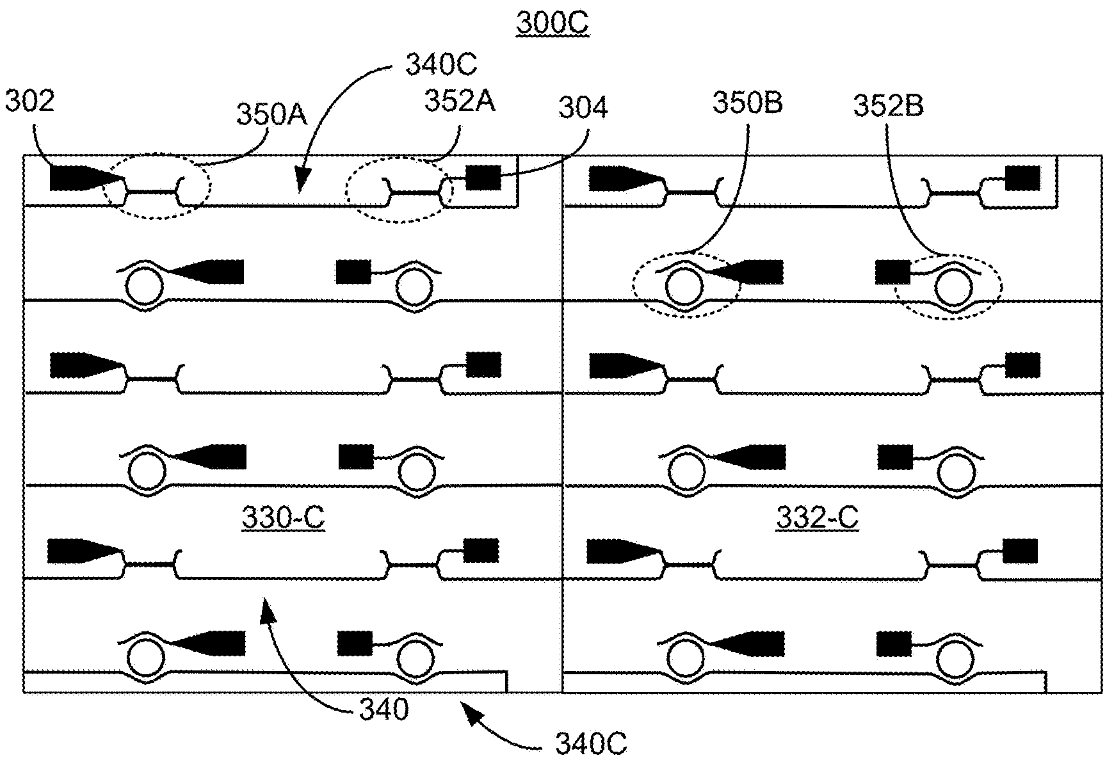

FIGS. 3A-3C depict embodiments of optical systems 300A, 300B and 300C having interconnects configurably stitched using active optical switches. More specifically, FIG. 3A depicts optical system 300A. FIG. 3B depicts optical system 300B. FIG. 3C depicts optical system 300C. For clarity, not all portions of optical systems 300A, 300B and 300C are shown. FIGS. 3A-3C are not to scale. Optical systems 300A, 300B and 300C may be capable of providing communication between multiple regions, each of which may be formed using a reticle. Thus, optical systems 300A, 300B and 300C provide communication between regions formed using different exposures. In some embodiments, optical systems 300A, 300B and 300C are interposers. Thus, optical systems 300A, 300B and 300B may be integrated with another device, such as GPU(s), hardware accelerator(s), or other large scale devices. Optical systems 300A, 300B and 300B may provide communication across multiple regions for a large module (e.g., a device including multiple regions). To do so, optical systems 300A, 300B and 300C provide connectivity across multiple regions of optical systems 300A, 300B and 300C, respectively. For example, optical systems 300A, 300B and 300C may provide communication between regions for wafer-scale devices. Thus, optical systems 300A, 300B and 300C are analogous to optical system 100. Consequently, analogous components have similar labels.

Referring to FIG. 3A, optical system 300A includes regions 330-A and 332-A that are analogous to regions 130 of optical system 100. Similarly, optical system 300A includes local waveguides 340 (of which only one is labeled) analogous to local waveguides 140. In the embodiment shown, optical system 300A also includes optical ports 302 and 304 analogous to ports 102 and 104. Optical input ports 302 may include components such as grating couplers. Optical output ports 304 may provide optical connection to a photodiode. Different input ports and/or output ports may be provided in some embodiments. For example, both ports 302 and 304 may be grating couplers to allow for input or output of optical signals at either location. In the embodiment shown, regions 330-A and 330-B are the same. Thus, regions 330-A and 330-B may be formed using a single reticle, which is used for multiple exposures. Further, 330-A and 332-A are aligned such that a local waveguide 340 in one region 330-A is aligned with the local waveguide 340 in another region 332-A. Thus, without more, regions 330-A and 332-A may transmit signals through the region. In some embodiments, some local waveguides may not terminate at a stitch on one or the other edge. In such embodiments, those local waveguides would not transmit optical signals to the adjoining region.

Optical system 300A also includes configurable connections 350A and 352A. In the embodiment shown, configurable connections 350A and 352A are located adjacent to optical ports 302 and 304. In other embodiments, configurable connection(s) 350A and/or 352A may be located elsewhere. Configurable connections 350A and 352A are active connections that may be selectively energized (or enabled) during use of optical system 300A. Configurable connections 350A and 352A may be viewed as optical switches that may be used to connect to ports 302 and/or 304 to local waveguide 340. Thus, configurable connections 350A and 352A may be used to add optical signals to local waveguide 340 and/or to drop an optical signal.

In optical system 300A, configurable connections 350A and 352A are Mach-Zehnder switches. In some embodiments, Mach-Zehnder switches 350A and 352A are formed using an electro-optic material such as thin film lithium niobate (TFLN), thin film lithium tantalate (TFLT), and/or barium titanate (BTO). For example, Mach-Zehnder switch 350A may transmit to local waveguide 140 input signals from grating 302, may transmit the optical signals from an adjacent region (not shown) (e.g., adding to this optical signal any signal providing via input grating 302), or may prevent the optical signal from being transmitted to local waveguide 340. Similarly, Mach-Zehnder switch 352A may provide the optical signal on local waveguide 140 to port/photodiode 304 or may transmit the optical signal on local waveguide 140 to the next region 332-A. The specific function of each Mach-Zehnder switch 350A and 352A depends upon the phase difference induced between the arms of each Mach-Zehnder switch. In some embodiments, Mach-Zehnder switch(es) 350A and/or 352A may not work in conjunction with ports 302 and 304. In such embodiments, Mach-Zehnder switch(es) 350A and 352A may simply transmit or terminate the signal for local waveguide 340. Thus, although regions 330-A and 332-A include the same structure in the same configuration, connectivity through the interconnect fabric formed by local waveguides 340 and Mach-Zehnder switches 350-A and 352-A may be altered during use of optical system 300A.

Referring to FIG. 3B, optical system 300B is analogous to optical system 300A. Thus, analogous components are similarly labeled. Optical system 300B thus includes regions 330-B and 332-B, local waveguides 340, ports 302 and 304, and configurable connections 350B and 352B that are analogous to regions 330-A and 332-A, local waveguides 340, ports 302 and 304, and configurable connections 350B and 352A, respectively. Thus, region 332-B is the same as region 330-B (i.e. includes substantially the same structures in substantially the same layout). However, configurable connections 350B and 352B are micro-rings. Although micro-rings 350B and 352B are used, their operation is analogous to that of Mach-Zehnder switches 350A and 352A. Thus, although regions 330-B and 332-B include the same structure in the same configuration, connectivity through the interconnect fabric formed by local waveguides 340 and micro-ring switches 350-B and 352-B may be altered during use of optical system 300B.

Referring to FIG. 3C, optical system 300C is analogous to optical systems 300A and 300B. Thus, analogous components are similarly labeled. Optical system 300C thus includes regions 330-C and 332-C, local waveguides 340, and ports 302 and 304 that are analogous to regions 330-A/330-B and 332-A/332-B, local waveguides 340, and ports 302 and 304. In addition, each region 330-C and 332-C includes local waveguides 340C that have a different path, providing connection to regions (not shown) above and below regions 330-C and 332-C. Thus, optical signals may be routed in orthogonal directions (e.g., horizontally and vertically). Region 332-C is the same as region 330-C (i.e. includes substantially the same structures in substantially the same layout). However, the configurable connections for optical system 300C include both Mach-Zehnder switches 350A and 352A and micro-ring switches 350B and 352B. Thus, although regions 330-C and 332-C include the same structure in the same configuration, connectivity through the interconnect fabric formed by local waveguides 340, Mach-Zehnder switches 350A and 352A and micro-ring switches 350-B and 352-B may be altered during use of optical system 300C.

Optical systems 300A, 300B, and 300C may share the benefits of optical systems 100, 200, 200', and/or 200". Optical systems 300A, 300B, and 300C facilitate the use of large modules, such as wafer-scale devices. Local waveguides 340 and 340C in each region 330-A. 332-A, 330-B, 332-B, 330-C, and 332-C in combination with configurable connections formed by the optical switches 350A, 352A, 350B, and/or 352B may provide the desired connections between each of the regions. Further, the waveguides formed using local waveguides 340 and 340C are capable of carrying the desired signals across multiple regions and for relatively long distances with the desired reliability and/or signal losses. Thus, signal integrity and low losses may be preserved over distances across wafer-scale optical systems 300A, 300B, and 300C as well as the corresponding wafer-scale device (not shown) with which optical systems 300, 300A, 300B, and 300C may be used. Thus, an optical interconnect fabric may be provided in optical systems 300A, 300B, and 300C without requiring unique reticles for each region. In some embodiments, the same reticle (or a single set of reticles) may be used for all regions despite having the desired communication across region boundaries. Manufacturability may be improved and costs reduced. In some embodiments, optical systems 300A, 300B, and 300C may be fabricated using existing manufacturing techniques. Thus, yield may not be adversely affected by the use of optical systems 300A, 300B, and 300C. Consequently, performance and manufacturability of wafer-scale devices may be improved.

Figure 4A:
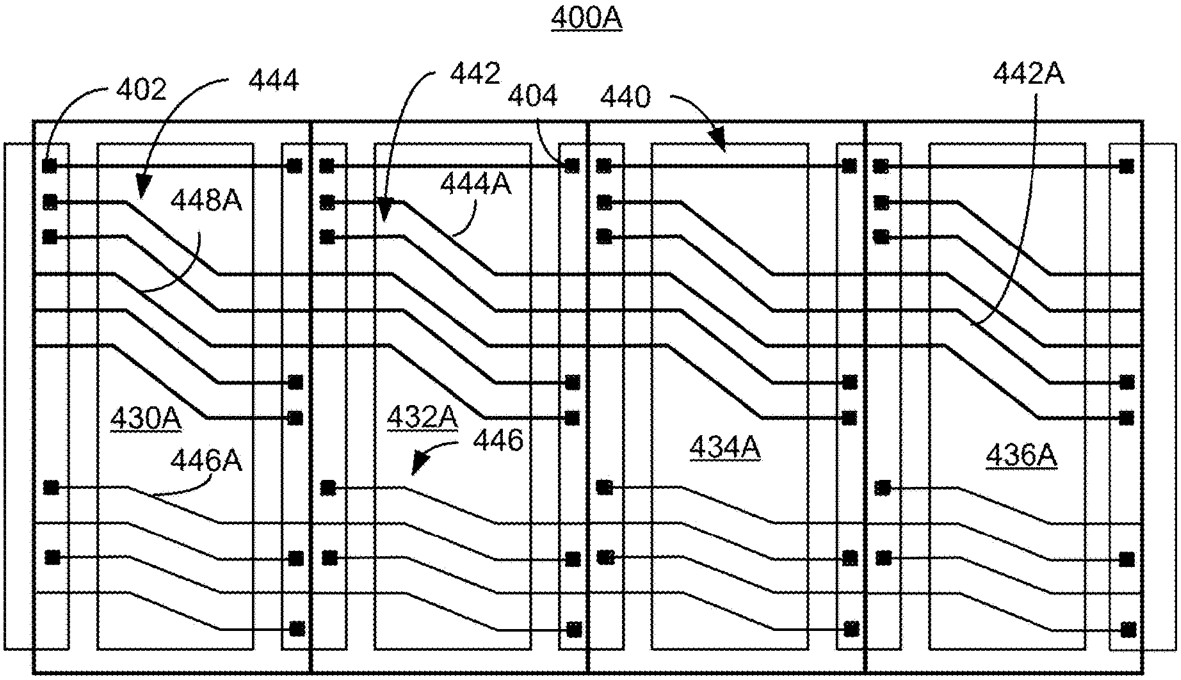
FIGS. 4A-4C depict embodiments of devices having interconnects configurably stitched using interconnect path offsets and/or electrical switches.
Figure 4B:
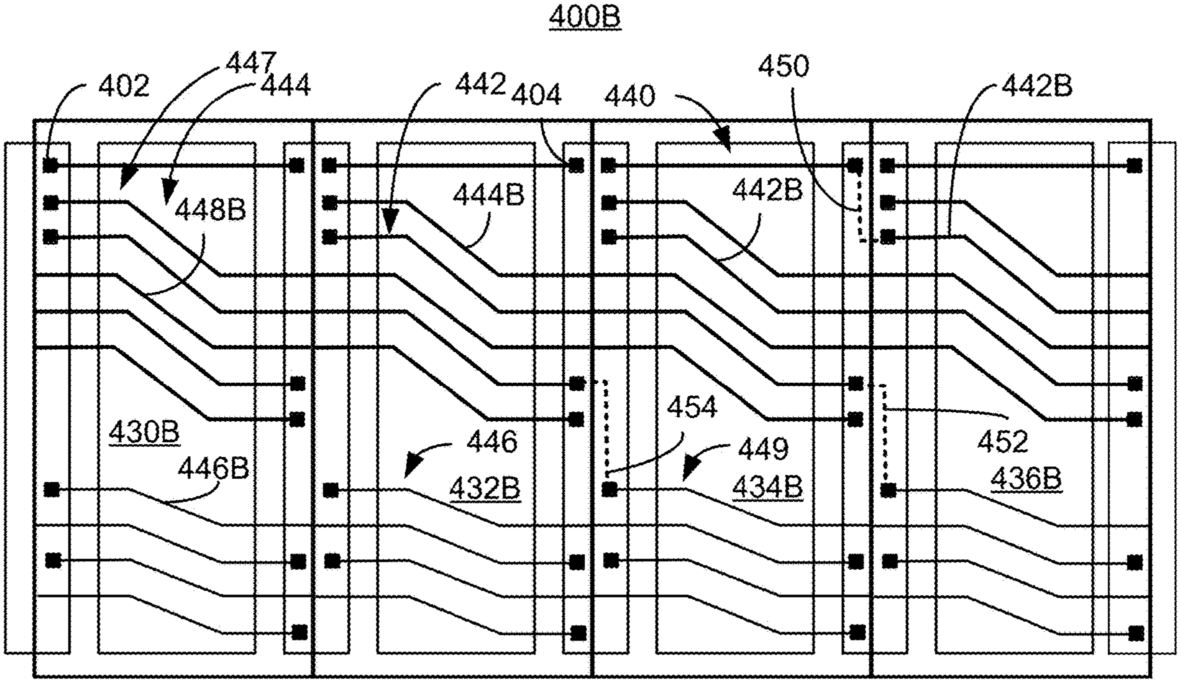
Figure 4C:
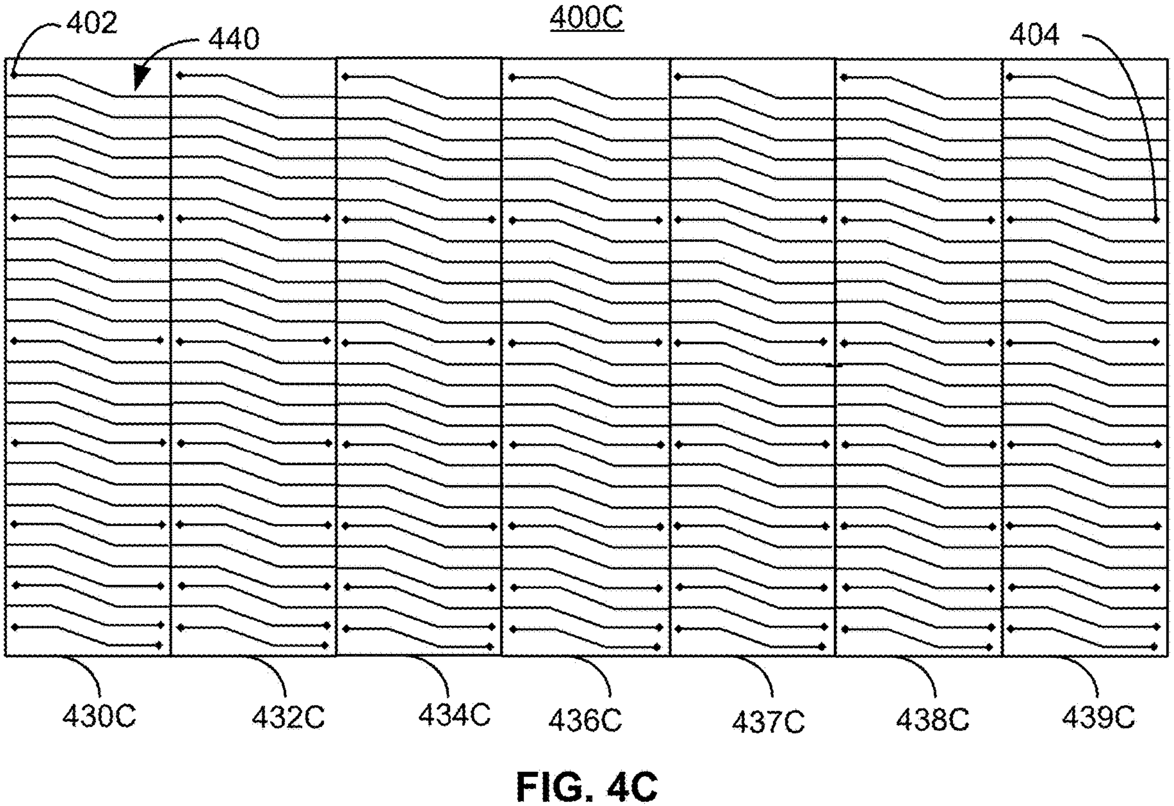

FIGS. 4A-4C depict embodiments of optical systems 400A, 400B and 400C having interconnects configurably stitched using interconnect path offsets and/or electrical switches. More specifically, FIG. 4A depicts optical system 400A. FIG. 4B depicts optical system 400B. FIG. 4C depicts optical system 400C. For clarity, not all portions of optical systems 400A, 400B and 400C are shown. FIGS. 4A-4C are not to scale. Optical systems 400A, 400B and 400C may be capable of providing communication between multiple regions, each of which may be formed using a reticle. Thus, optical systems 400A, 400B and 400C provide communication between regions formed using different exposures. In some embodiments, optical systems 400A, 400B and 400C are interposers. Thus, optical systems 400A, 400B and 400B may be integrated with another device, such as GPU(s), hardware accelerator(s), or other large scale devices. Optical systems 400A, 400B and 400B may provide communication across multiple regions for a large module (e.g., a device including multiple regions). To do so, optical systems 400A, 400B and 400C provide connectivity across multiple regions of optical systems 400A, 400B and 400C, respectively. For example, optical systems 400A, 400B and 400C may provide communication between regions for wafer-scale devices. Thus, optical systems 400A, 400B and 400C are analogous to optical system 100. Consequently, analogous components have similar labels. Although described as a single waveguide, a local waveguide in optical devices 400A, 400B, and/or 400C may actually include multiple waveguides (e.g., a bundle of waveguides).

Referring to FIG. 4A, optical system 400A includes regions 430A, 432A, 434A, and 436A that are analogous to regions 130 of optical system 100. Similarly, optical system 400A includes local waveguides 440, 442A, 444A, and 446A (of which only one of each is labeled) analogous to local waveguides 140. Optical system 400A also includes optical ports 402 and 404 analogous to ports 102 and 104. In the embodiment shown, regions 430A, 432A, 434A, and 436A are all the same. Thus, regions 430A, 432A, 434A, and 436A may be formed using the same reticle. In other embodiments, some of regions 430A, 432A, 434A, and/or 436A may be formed using different reticle(s). In such embodiments, regions 430A, 432A, 434A, and/or 436A may be different.

Local waveguides 440 extend between ports 402 and 404 within each region 430A, 432A, 434A, and 436A. Local waveguides 440 provide the shortest path from one edge of each region 430A, 432A, 434A, and 436A to an opposite edge of the region 430A, 432A, 434A, and 436A. Thus, local waveguides 440 do not have a waveguide path offset. Remaining local waveguides may be connected to port 402 near one edge (e.g., local waveguide 444A), may be connected to port 404 near the opposite edge (e.g., local waveguide 442A), or not connected to ports (e.g., local waveguide 448A) within the same region. Further, local waveguides 442A, 444A, and 448A have waveguide path offsets (e.g., the zig-zag shaped path). Thus, local waveguides are closer to the top of the corresponding region on one edge than they are at the opposite edge. The path offset is the same for local waveguides 442A, 444A, and 448A. Local waveguides 442A, 444A, and 448A are also separated by the same distance. Local waveguides 442A, 444A, and 448A are parallel. Thus, a portion of local waveguides 442A, 444A, and 448A near one edge of a region are aligned with the portion of local waveguides 442A, 444A, and 448A near an opposite edge of another region. Because of the waveguide path offset and distance, local waveguides 442A, 444A, and 448A are connected to make longer waveguides. For example, waveguide 442 extends between two regions (e.g. from region 432A to region 432B). Waveguide 444 extends across three regions (e.g. from region 430A, through region 432A, and to region 434A). Each region also includes local waveguides 446A having a different path offset and, in some embodiments, a different spacing. Local waveguides 446 may thus have a different zig-zag shaped path. Corresponding waveguides 446 extend between two regions (e.g., regions 432A and 434A).

Local waveguides 442A, 444A, 446A, and 448A may be considered to be configurably connected across stitches through waveguide path offset and the spacing (i.e. the layout). Despite being formed by the same reticle and having the same configuration, regions 430A, 432A, 434A, and 436A are interconnected not only between neighboring regions, but also with more remote regions. In some embodiments, regions 430A, 432A, 434A, and 436A may have local waveguides laid out such that all four regions may be interconnected.

Referring to FIG. 4B, optical system 400B is analogous to optical system 400A. Thus, analogous components are similarly labeled. Optical system 400B thus includes regions 430B, 432B, 434B, and 436B, local waveguides 440, 442B, 444B, 446B, and 448B, and ports 402 and 404 that are analogous to regions 430A, 432A, 434A, and 436A, local waveguides 440, 442A, 444A, 446A, and 448A, and ports 402 and 404, respectively. Thus, each region 430B, 432B, 434B, and 436B is the same as another region 430B, 432B, 434B, and 436B. Local waveguides local waveguides 440, 442B, 444B, 446B, and 448B are thus configurably connected by the waveguide path offsets and spacing, in an analogous manner to local waveguides local waveguides 440, 442A, 444A, 446A, and 448A. Stated differently, the layout of regions 430B, 432B, 434B, and 436B provide the configurable connections between regions 430B, 432B, 434B, and 436B.

Optical system 400 also includes additional configurable connections 450, 452, and 454. Although three configurable connections 450, 452, and 454 are shown, another number may be present. In some embodiments, configurable connections 450, 452, and 454 are electrical connections. Thus, configurable connections 450, 452, and 454 may be active connections that may be selectively enabled/disabled during use of optical device 400B. Configurable connections 450, 452, and 454 extend the connectivity of regions 430B, 432B, 434B, and 436B. For example, active configurable connections 450 can connect local waveguide 440 with a local waveguide 442B of region 436B. Thus, region 434B may communicate with another region adjacent to region 436B. Similarly, configurable connection 452 connects waveguide 442 with a waveguide section 446B of region 436B. Consequently, region 430B may communicate with another region adjacent to region 436B. Similarly, configurable connections 454 connects region 430B with region 436B via waveguides 447 and 449. Thus, optical system 400B provides connectivity within a region (via local waveguide 440), to a neighboring region (e.g. via local waveguides 446B), and to a next nearest neighbor region (e.g. via waveguide 444). In addition, a region (e.g., region 430B) may be connected to the next next nearest neighbor region (e.g., region 436B) by waveguides 447 and 449 and active configurable connections 452. Consequently, the configurability of the connections and communication between regions may be further improved. In addition, active connections 450, 452, and 454 may be provided along with the remaining devices in each region 430B, 432B, 434B, and 436B. Thus, the same reticle may be used for active connections 450, 452 and 454 as for remaining devices in the regions 430B, 432B, 434B, and 436B.

Referring to FIG. 4C, optical system 400C is analogous to optical systems 400A and 400B. Thus, analogous components are similarly labeled. Optical system 400C thus includes regions 430C, 432C, 434C, and 436C as well as ports 402 and 404 (of which only one each is labeled) and local waveguides 440 (of which, only one is labeled). However optical system 400C also includes regions 437C, 438C, and 439C. Optical system 400C thus includes seven regions that are the same and may be formed using the same reticle. Each local waveguide 440 includes a waveguide path offset and may or may not be connected with a port 402 or 404.

Local waveguides local waveguides 440 are thus configurably connected by the waveguide path offsets and spacing, in an analogous manner to local waveguides 440, 442A, 444A, 446A, and 448A. Stated differently, the layout of regions 430B, 432B, 434B, and 436B provide the configurable connections between regions 430B, 432B, 434B, and 436B. Ports 404 and 404 and local waveguides are configured such that each region 430C, 432C, 434C, 436C, 437C, 438C, and 439C is connected with every other region 430C, 432C, 434C, 436C, 437C, 438C, and 439C because of the layout of each region 430C, 432C, 434C, 436C, 437C, 438C, and 439C. Although not shown, other techniques, such as electrical switches (e.g. configurable connections 450, 452 and/or 454) may provide additional flexibility in the communication using optical device 400C.

Optical systems 400A, 400B, and 400C may share the benefits of optical systems 100, 200, 200', 200", 300A, 300B, and/or 300C. Optical systems 400A, 400B, and 400C facilitate the use of large modules, such as wafer-scale devices. Local waveguides 440, 442A, 442B, 444A, 444B, 446A, 446B, 448A, and 448B in each region may provide the desired connections across stitches (e.g. between regions). If used in combination with configurable connections 450, 452, and/or 454 connectivity between regions may be extended to additional configurations. Further, the waveguides formed are capable of carrying the desired signals across multiple regions and for relatively long distances with the desired reliability and/or signal losses. Thus, signal integrity and low losses may be preserved over distances across wafer-scale optical systems 400A, 400B, and 400C as well as the corresponding wafer-scale device (not shown) with which optical systems 400, 400A, 400B, and 400C may be used. Thus, an optical interconnect fabric may be provided in optical systems 400A, 400B, and 400C without requiring unique reticles for each region. Instead, a single reticle or a single set of reticles might be used for all regions while providing the desired communication across region boundaries. Manufacturability may be improved and costs reduced. In some embodiments, optical systems 400A, 400B, and 400C may be fabricated using existing manufacturing techniques. Thus, yield may not be adversely affected by the use of optical systems 400A, 400B, and 400C. Consequently, performance and manufacturability of wafer-scale devices may be improved.

Figure 5A:
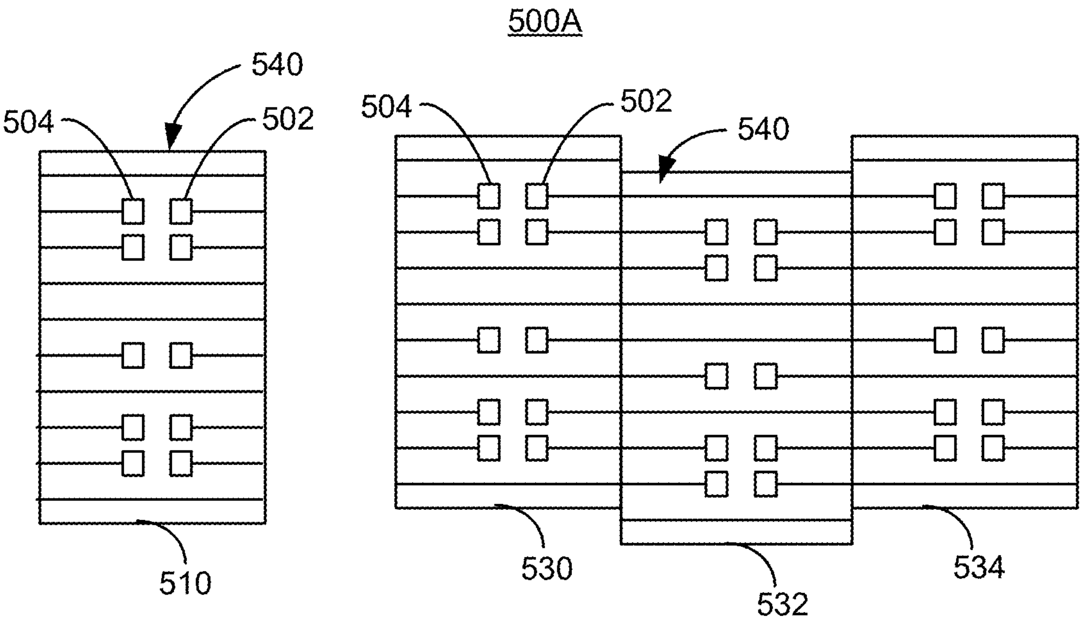
FIGS. 5A-5B depict embodiments of devices having interconnects configurably stitched using reticle offsets and/or rotations.
Figure 5B:
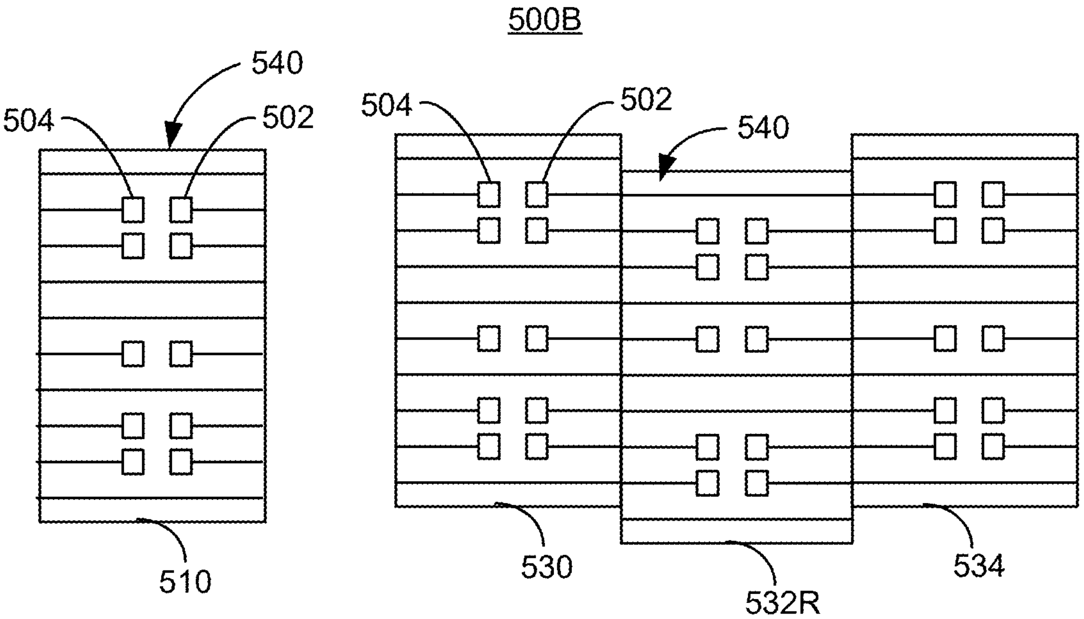

FIGS. 5A-5B depict embodiments of optical systems 500A and 500B having interconnects configurably stitched using reticle offsets and/or rotations. FIG. 5A depicts optical system 500A. FIG. 5B depicts optical system 500B. For clarity, not all portions of optical systems 500A and 500B are shown. FIGS. 5A-5B are not to scale. Optical systems 500A and 500B may be capable of providing communication between multiple regions, each of which may be formed using a reticle. Thus, optical systems 500A and 500B provide communication between regions formed using different exposures. In some embodiments, optical systems 500A and 500B are interposers. Thus, optical systems 500A and 500B may be integrated with another device, such as GPU(s), hardware accelerator(s), or other large scale devices. Optical systems 500A and 500B may provide communication across multiple regions for a large module (e.g., a device including multiple regions). To do so, optical systems 500A and 500B provide connectivity across multiple regions of optical systems 500A and 500B, respectively. For example, optical systems 500A and 500B may provide communication between regions for wafer-scale devices. Thus, optical systems 500A and 500B are analogous to optical system 100. Also shown in FIG. 5 is reticle 510 that is analogous to reticles 110-A and 110-B. Consequently, analogous components have similar labels. Although described as a single waveguide, a local waveguide in optical systems 500A and/or 500B may include multiple waveguides.

Referring to FIG. 5A, optical system 500A includes regions 530, 532, and 534 that are analogous to regions 130 of optical system 100. Similarly, optical system 5000A includes local waveguides 540 (only one of which is labeled) analogous to local waveguides 140. Optical system 400A also includes optical ports 502 and 504 analogous to ports 102 and 104. In the embodiment shown, regions 530A, 532A, and 534A are all formed using the same reticle 510. Reticle 510 has corresponding structures 502, 504, and 540 used in forming ports 502 and 504 and local waveguides 540, respectively. Thus, regions 530, 532, and 534 may be formed using the same reticle. In other embodiments, some regions (not shown) may be formed using different reticle(s).

In forming optical system 500A, reticle 510 is shifted, or offset, between exposures. Thus, region 532 is offset from regions 530 and 534. The offset is such that a particular local waveguide in one region is connected to a different local waveguide in adjoining regions. Consequently, each region 530, 532 and 534 are configurably stitched (e.g., optically connected) to other regions 530, 532, and 534. For example, one port 502 in region 530 may be coupled to port 504 in region 532. Another port 503 in region 530 is connected to port 504 in region 534. Regions 532 and 534 are similarly connected. Thus, the configurable stitching between regions 530, 532, and 534 is accomplished by the offset used for reticle 510 and the layout of each region 530, 532, and 534 (e.g., the location of local waveguides 540 and ports 502 and 504).

Referring to FIG. 5B, optical system 500B is analogous to optical system 500A. Thus, analogous components are similarly labeled. Optical system 500B thus includes regions 530, 532R, and 534, local waveguides 540, and ports 502 and 504 that are analogous to regions 530, 532 and 534, local waveguides 540, and ports 502 and 504, respectively, of optical system 500A. Also shown is reticle 510, which is the same as reticle 510 of FIG. 5A. In addition to being offset, reticle 510 is rotated one hundred and eighty degrees in forming region 532R. As a result, the connection between regions 530, 532R, and 534 differs from the connectivity between regions 530, 532, and 534. Thus, by offsetting, rotating, and/or both offsetting and rotating reticle 510, a variety of connections may be achieved across boundaries of regions 530, 532/532R, and 534.

Optical systems 500A and 500B may share the benefits of optical systems 100, 200, 200', 200", 300A, 300B, 300C, 400A, 400B, and/or 400C. Optical systems 500A and 500B facilitate the use of large modules, such as wafer-scale devices. Local waveguides 540 in each region may provide the desired connections across stitches (e.g. between regions). If offset(s) are used in combination with rotation(s) of reticle 510, connectivity between regions 530, 532/532R, and 534 may be extended to additional configurations. Further, the waveguides formed are capable of carrying the desired signals across multiple regions and for relatively long distances with the desired reliability and/or signal losses. Thus, signal integrity and low losses may be preserved over distances across wafer-scale optical systems 500A and 500B as well as the corresponding wafer-scale device (not shown) with which optical systems 500A and 500B may be used. Thus, an optical interconnect fabric may be provided in optical systems 500A and 500B without requiring unique reticles for each region. In some embodiments, the same reticle or the same set of reticles may be used for all regions despite having the desired communication across region boundaries. Manufacturability may be improved and costs reduced. In some embodiments, optical systems 500A and 500B may be fabricated using existing manufacturing techniques. Thus, yield may not be adversely affected by the use of optical systems 500A and 500B. Consequently, performance and manufacturability of wafer-scale devices may be improved.

Figure 6A:
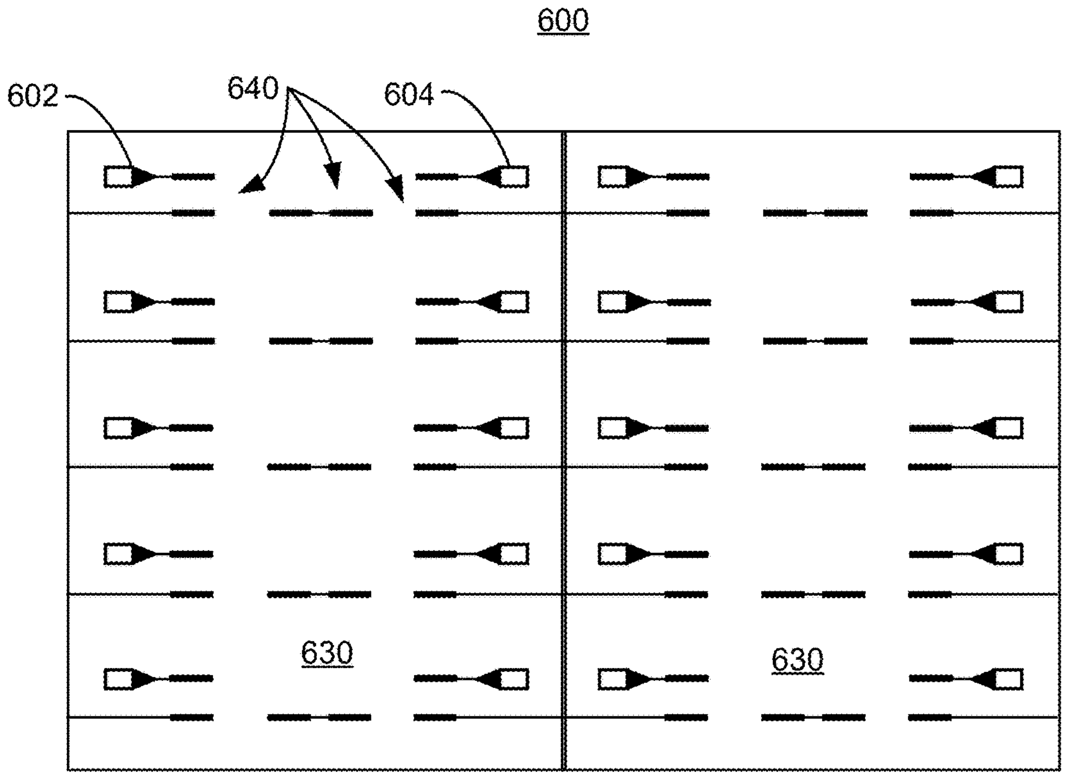
FIGS. 6A-6E depict embodiments of devices having interconnects configurably stitched using jumpers and interconnect path offsets.
Figure 6B:
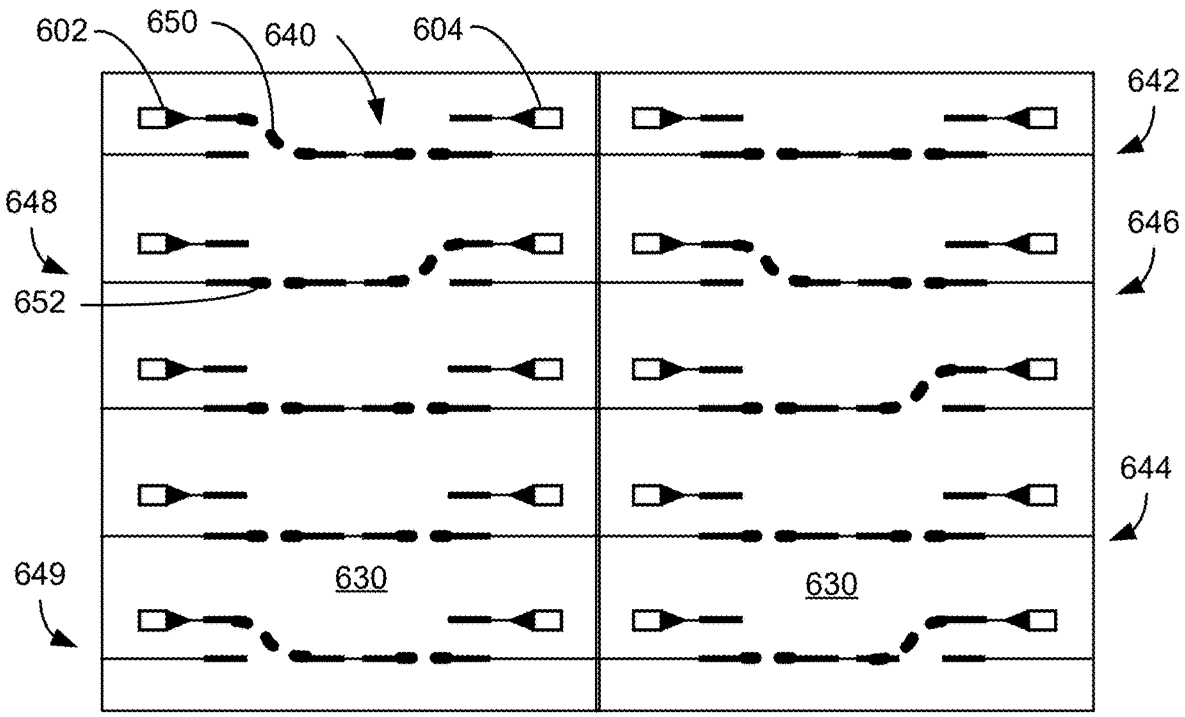

FIGS. 6A-6E depict embodiment of optical systems 600 and 600' having interconnects configurably stitched using jumpers and interconnect (e.g. waveguide) path offsets. FIG. 6A depicts optical system 600. FIG. 6B depicts optical system 600'. For clarity, not all portions of optical systems 600 and 600' are shown. FIGS. 6A-6B are not to scale. Optical systems 600 and 600' may be capable of providing communication between multiple regions, each of which may be formed using a reticle. Thus, optical systems 600 and

600' provide communication between regions formed using different exposures. In some embodiments, optical systems 600 and 600' are interposers. Thus, optical systems 600 and 600' may be integrated with another device, such as GPU(s), hardware accelerator(s), or other large scale devices. Optical systems 600 and 600' may provide communication across multiple regions for a large module (e.g., a device including multiple regions). To do so, optical systems 600 and 600' provide connectivity across multiple regions 630 and 630' of optical systems 600 and 600', respectively. For example, optical systems 600 and 600' may provide communication between regions for wafer-scale devices. Thus, optical systems 600 and 600' are analogous to optical system 100. Consequently, analogous components have similar labels. Although described as a single waveguide, a local waveguide in optical systems 600 and/or 600' may include multiple waveguides.

Referring to FIG. 6A, optical system 600 is shown during fabrication. Optical system 600 includes regions 630 that are analogous to regions 130 of optical system 100. Similarly, optical system 600 includes local waveguides 640 (only some of which are labeled) analogous to local waveguides 140. In some embodiments, local waveguides 640 may be considered waveguide segments. Local waveguides 640 are aligned such that a portion of local waveguide 640 at one edge of a region 630 is aligned with a portion of the local waveguide 640 at the opposite edge of an adjacent region 630. Optical system 400A also includes optical ports 602 and 604 analogous to ports 102 and 104. For example, grating couplers may be used in ports 602 and/or 604. In the embodiment shown, regions 630 are all formed using the same reticle. In other embodiments, some regions (not shown) may be formed using different reticle(s).

Figure 6C:
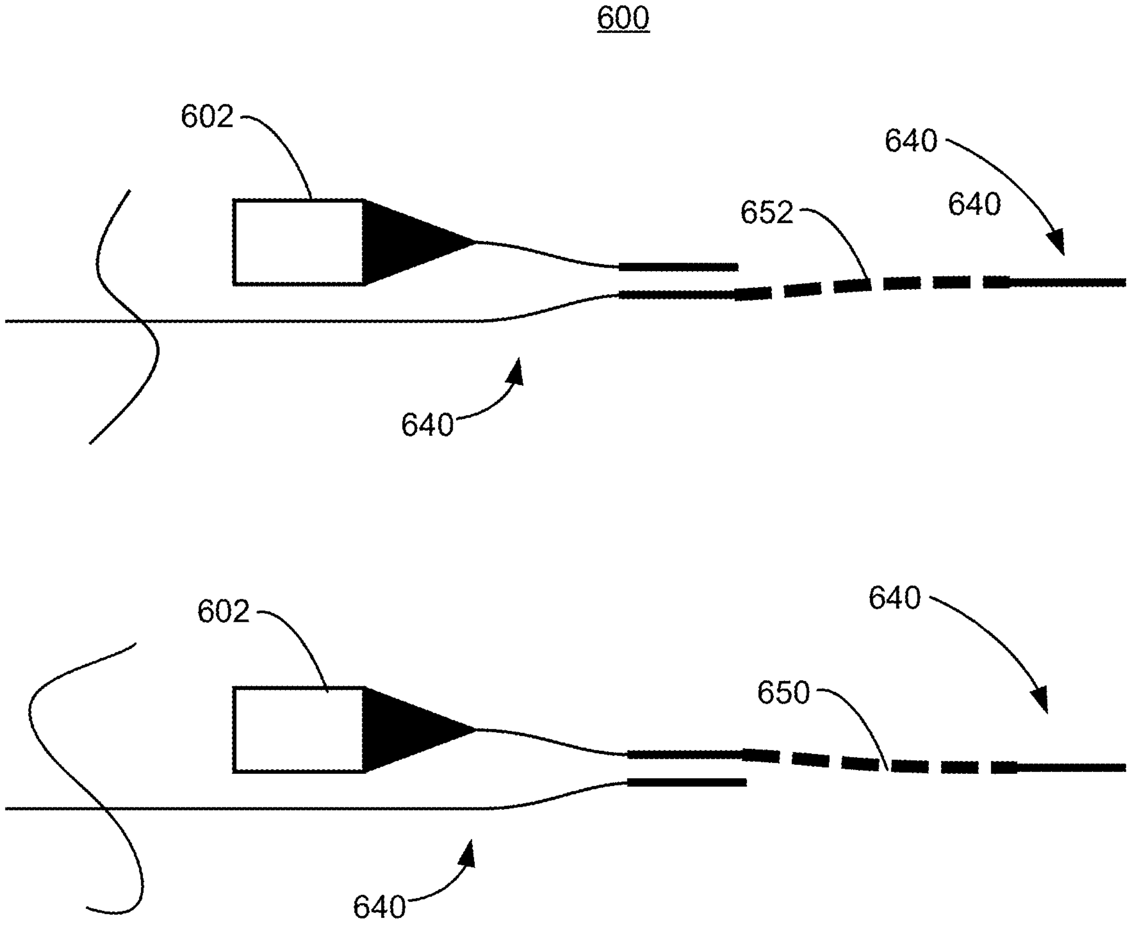

FIG. 6B depicts optical system 600 after formation of configurable connections 650 and 652 (indicated by heavy dotted lines). FIG. 6C depicts close up views of embodiments of configurable connections 650 and 652. Configurable connections 650 and 652 are analogous to configurable connections 150. Configurable connections 650 and 652 may be considered jumpers. Jumpers 650 connect local waveguide 640 to a port 602 or 604. Jumpers 652 connect a middle segment of local waveguides 640 to another segment of a local waveguide 640. Jumpers 652 thus bypass ports 602 and 604. Thus, jumpers 650 and 652 may be considered short waveguides similar to local waveguides 640. In some embodiments, jumpers 650 and 652 may be low loss waveguides. Although jumpers 652 are shown as aligned with local waveguides 640, in some embodiments, jumpers 652 might connect a local waveguide 640 to another local waveguide 640 in the same region 630 (e.g. further down the column of local waveguides) or across regions 630. In some embodiments, jumpers 650 and 652 may be fabricated in a single-shot process. For example, although standard reticle processes may be used in forming the portion of optical system 600 depicted in FIG. 6A, a direct write process may be used to form jumpers 650 and 652. However, other procedures may be used. As indicated in FIG. 6C, in some embodiments, jumpers 650 and 652 and local waveguides 640 may have bends. For example, Euler bends may be used to reduce the bend radius of local waveguides 640 and/or jumpers 650 and 652.

Jumpers 650 and 652 provide configurable connections between local waveguides. For example, waveguide 642 provides a connection from port 602 in one region through the adjacent region. Waveguides 646 and 648 may provide connection to other region(s) that are not shown. Waveguide 644 may provide connections through multiple regions. Waveguide 648 provide connections between one region 630 and an adjacent region. Thus, the desired connectivity across stitches and between regions 630 may be provided.

Figure 6D:
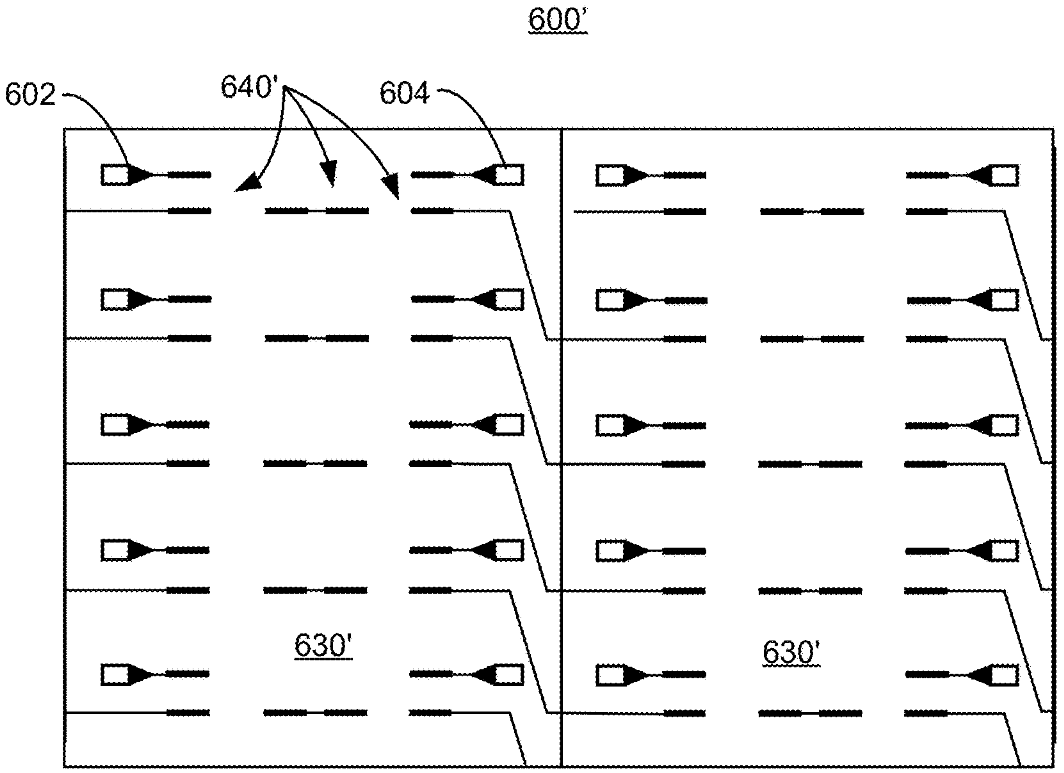
Figure 6E:
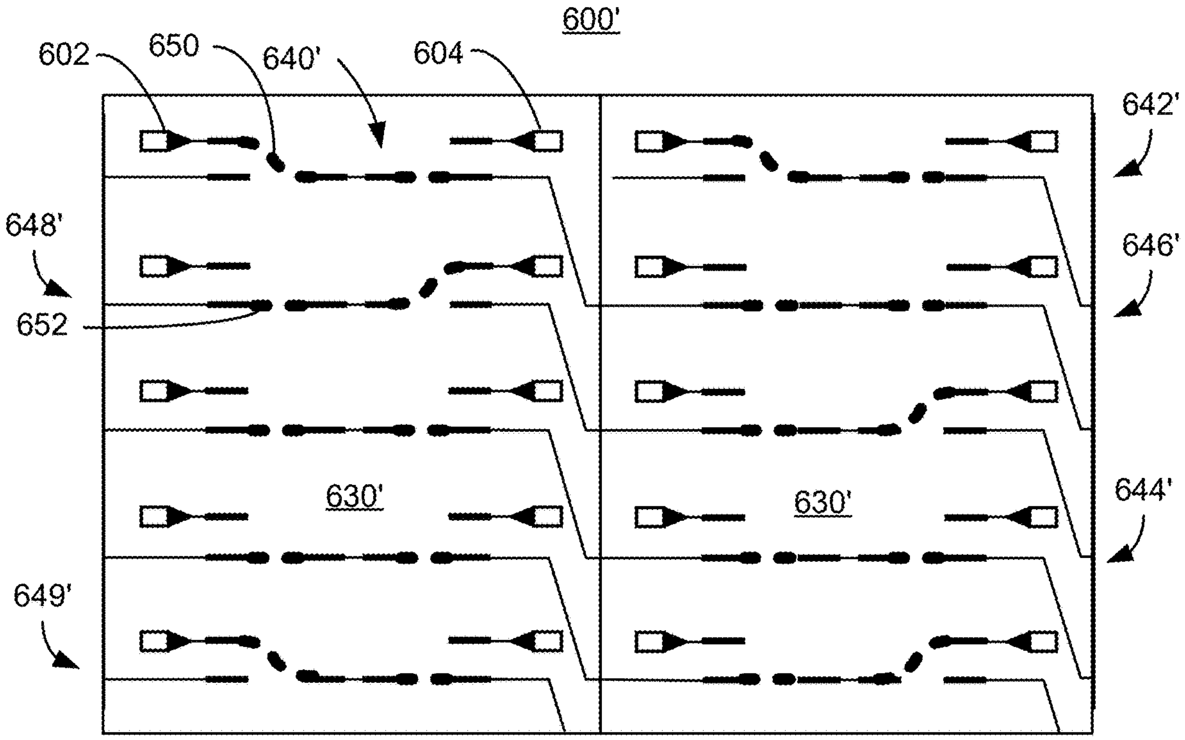

FIGS. 6D and 6E depict an embodiment of optical system 600' during fabrication. FIG. 6D depicts optical device 600' before formation of configurable connections. FIG. 6E depicts optical device after formation of configurable connections (i.e., jumpers) 650 and 652. Jumpers 650 and 652 are indicated by heavy dotted lines. Optical device 600' is analogous to optical device 600. Thus, analogous components have similar labels. Optical device 600' includes regions 630', local waveguides 640' (which may be considered waveguide segments), and ports 602 and 604 that are analogous to regions 630, local waveguides 640 (which may be considered waveguide segments), and ports 602 and 604 of optical device 600. However, local waveguides 640' include waveguide offsets. Thus, a portion of local waveguide 640' near an edge of region 630' is aligned with a portion of another local waveguide 640' near an opposing edge, where the other local waveguide is in a different row. Thus, although jumpers 650 and 652 of optical system 600' have the same configuration as jumpers 650 and 652 of optical system 600, the connections across stitches between regions differ. Stated differently, waveguides 642', 644', 646', 648' and 649' provide a different set of connections than waveguides 642, 644, 646, 648, and 649, respectively.

Optical systems 600 and 600' may share the benefits of optical systems 100, 200, 200', 200", 300A, 300B, 300C, 400A, 400B, 400C, 500A and/or 500B. Optical systems 600 and 600' facilitate the use of large modules, such as wafer-scale devices. Local waveguides 640 and 640' in each region may provide the desired connections across stitches (e.g. between regions). Jumpers 650 and 652 may provide configurable connections across stitches without adding a significant number of processes to fabrication. If waveguide path offsets are used in combination jumpers 650 and 652, connectivity between regions 630 and 630' may be extended to additional configurations. Further, the waveguides formed are capable of carrying the desired signals across multiple regions and for relatively long distances with the desired reliability and/or signal losses. Thus, signal integrity and low losses may be preserved over distances across wafer-scale optical systems 600 and 600' as well as the corresponding wafer-scale device (not shown) with which optical systems 600 and 600' may be used. Thus, an optical interconnect fabric may be provided in optical systems 600 and 600' without requiring unique reticles for each region. In some embodiments, the same reticle or the same set of reticles may be used for all regions despite having the desired communication across region boundaries. Manufacturability may be improved and costs reduced. In some embodiments, optical systems 600 and 600' may be fabricated using existing manufacturing techniques. Thus, yield may not be adversely affected by the use of optical systems 600 and 600'. Consequently, performance and manufacturability of wafer-scale devices may be improved.

Figure 7A:
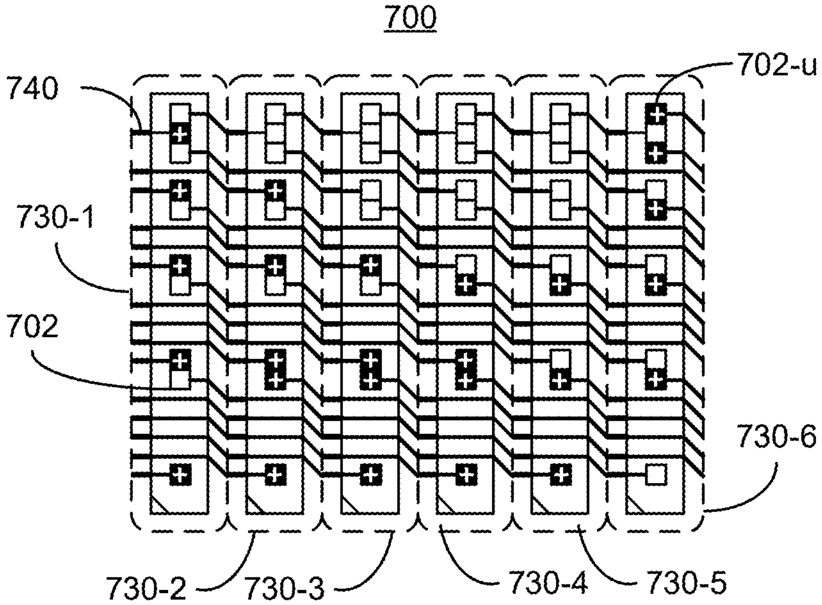
FIGS. 7A-7C depict embodiments of devices having configurably stitched interconnects using multiple reticles and/or reticle rotations.
Figure 7B:
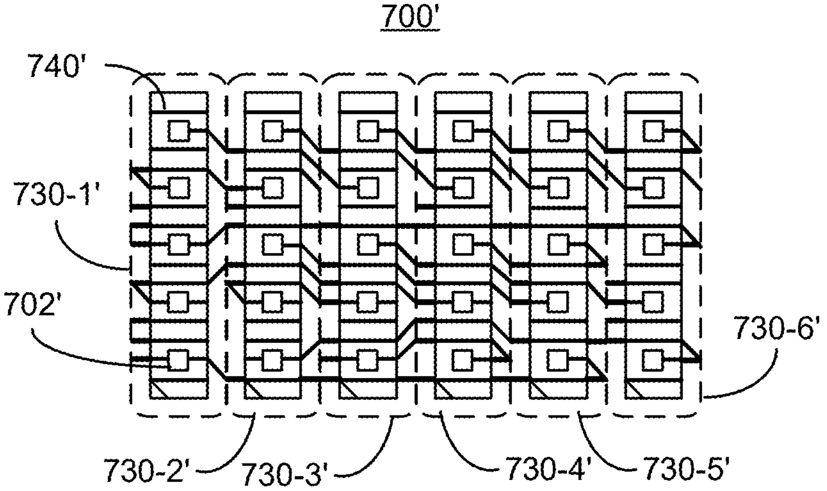
Figure 7C:
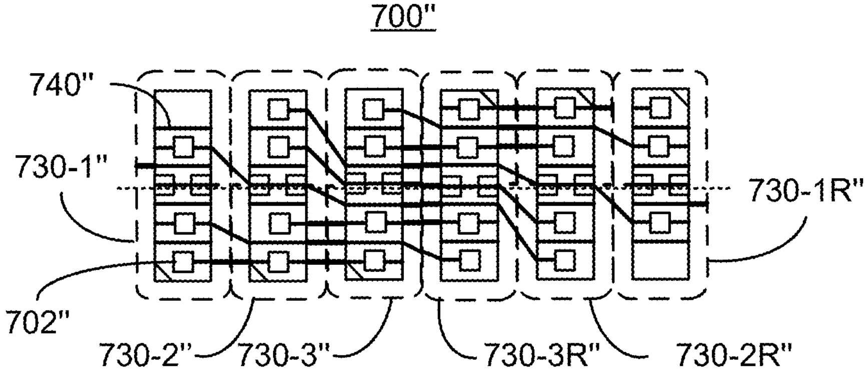

FIGS. 7A-7C depict embodiments of optical systems 700, 700' and 700" having configurably stitched interconnects formed using multiple reticles and/or reticle rotations. For clarity, not all portions of optical systems 700, 700' and 700" are shown. FIGS. 7A-7C are not to scale. Optical systems 700, 700' and 700" may be capable of providing communication between multiple regions, each of which may be formed using a reticle. Thus, optical systems 700, 700' and 700" provide communication between regions formed using different exposures. In some embodiments, optical systems 700, 700' and 700" are interposers. Thus, optical systems 700, 700' and 700' may be integrated with another device, such as GPU(s), hardware accelerator(s), or other large scale devices. Optical systems 700, 700' and 700" may provide communication across multiple regions for a large module (e.g., a device including multiple regions). To do so, optical systems 700, 700' and 700" provide connectivity across multiple regions of optical systems 700, 700' and 700", respectively. For example, optical systems 700, 700' and 700" may provide communication between regions for wafer-scale devices. Thus, optical systems 700, 700' and 700" are analogous to optical system 100. Consequently, analogous components have similar labels. For example, optical system 700 includes regions 730-1, 730-2, 730-3, 730-4, 730-5, and 730-6 that are analogous to regions 130 of optical system 100. Similarly, optical system 700 includes local waveguides 740 analogous to local waveguides 140, of which only one is labeled. Although described as a single waveguide, a local waveguide in optical system 700, 700', and/or 700" may include multiple waveguides.

Referring to FIG. 7A, optical device 700 includes regions 730-1, 730-2, 730-3, 730-4, 730-5, and 730-6 (collectively or generically 730). Each region 730 includes waveguides 740 (of which only one is labeled) and ports 702 (of which only one is labeled). Ports 702-*u* (of which only one is labeled), indicated by a white "+" sign are unused. Each region 730 is formed using a mask (not shown). A single mask may be used in forming all of regions 730. Differences in regions 730 occur because of which ports are used and which are unused. Thus, development costs for optical device 700 may be reduced. However, port utilization is only approximately fifty percent. Thus, optical device 700 occupies a larger area (due to the large number of unused ports 702-*u*), which is undesirable.

FIG. 7B depicts optical device 700' that is analogous to optical device 700. Optical device 700' includes regions 730-1', 730-2', 730-3', 730-4', 730-5', and 730-6' (collectively or generically 730'). Each region 730' includes waveguides 740' (of which only one is labeled) and ports 702' (of which only one is labeled). Each region 730 is formed using its own, unique mask. Thus, ports 702' have one hundred percent utilization (i.e. there are no unused ports 702-*u*). Thus, optical device 700' may have a smaller footprint and higher bandwidth density than optical device 700. However, the cost of unique masks for each region 730' is very large. In some instances, the cost of individual masks for each region 730 is prohibitive.

FIG. 7C depicts optical device 700" that includes regions 730-1", 730-2", 730-3", 730-1R", 730-1R", and 730-2" (collectively or generically 730"). Each region 730" includes waveguides 740" (of which only one is labeled) and ports 702" (of which only one is labeled). Regions 730-1" and 730-1R" are formed using the same mask. Similarly, regions 730-2" and 730-2R" are formed using the same mask. Regions 730-3" and 730-3R" are formed using the same mask. However, for regions 730-1R", 730-2R", and 730-3R" the mask has been rotated by one hundred and eighty degrees. In the embodiment shown, a symmetric one hundred and eighty degree mask rotation around center of wafer has been performed. Thus, the number of masks used has been cut in half. In some embodiments, the masks may be configured such that other angles of rotation may be used, while reducing the number of masks used. Electrical routing for 1-hop links (ports 102 along the central horizontal dotted line) and placing in the center of a reticle may allow for a further reduction in footprint despite less than one hundred percent port utilization. Thus, cost may be reduced while improving bandwidth and reducing the footprint from optical device 700. Although six reticle shots per row have been shown in optical devices 700, 700', and 700", another number of reticle shots per row may be used.

Optical systems 700, 700', and 700" may share the benefits of optical system 100. Optical systems 700, 700', and 700" facilitate the use of large modules, such as wafer-scale devices. Local waveguides in each region 730, 730', and 730" in combination with configurable connections formed by the layout, alignment, and orientation of reticles used in forming regions 730, 730', and 730" provide varying connectivity between regions 730, 730', and 730". Further, the waveguides 740, 740', and 740" are capable of carrying the desired signals across multiple regions and for relatively long distances with the desired reliability and/or signal losses. Thus, signal integrity and low losses may be preserved over distances across wafer-scale optical systems 700, 700', and/or 700" as well as the corresponding wafer-scale device (not shown) with which optical systems 700, 700', and/or 700" may be used. Furthermore, optical device 700", which uses a one hundred and eighty degree rotation for masks, may have a reduced footprint and a higher bandwidth than optical device 700, which uses a single mask and a single orientation of the mask. Optical device 700" has a reduced cost over optical device 700', which uses unique masks for each region 730' and does not allow for rotation of the mask. Thus, manufacturability may be improved and costs reduced for optical device 700". In some embodiments, optical systems 700, 700', and 700" may be fabricated using existing manufacturing techniques. Thus, yield may not be adversely affected by the use of optical system 700, 700', and/or 700". Consequently, performance and manufacturability of wafer-scale devices may be improved.

Figure 8:
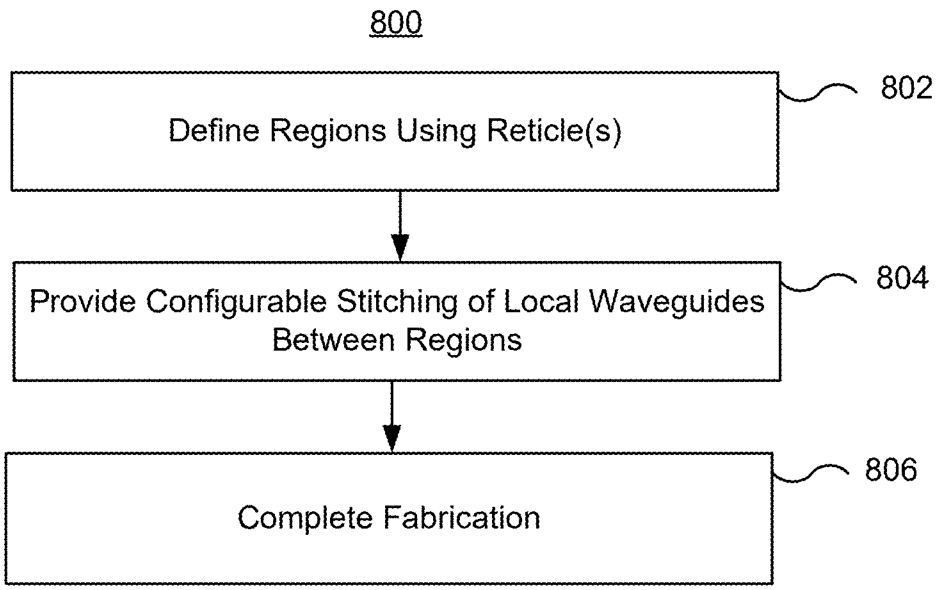
FIG. 8 is a flow chart depicting an embodiment of a method for providing devices having configurably stitched interconnects.

FIG. 8 is a flow chart depicting an embodiment of method 800 for providing a device having configurably stitched interconnects. Method 800 is described in the context of processes that may have sub-processes. Although described in a particular order, another order not inconsistent with the description herein may be utilized. For example, in some embodiments, portions of processes may be interleaved.

Multiple regions, each of which is formed using a reticle, are defined, at 802. In some embodiments, providing the regions includes providing input and/or output ports for the and/or one or more local waveguides. For example, an optical input subsystem in conjunction with optical source(s) (e.g., a grating coupler along with a laser) may be provided. In another example, an optical output subsystem coupled with the local waveguide. In some embodiments, 802 includes providing reticle(s) for the optical system, exposing mask material(s) using the reticle(s), and fabricating the appropriate layer(s) using the masks. Thus, the regions of the optical device may be provided.

Configurable stitching between regions is provided, at 804. In some embodiments, 804 may be implemented as part of 802. For example, where reticle offset(s) and/or reticle shifts are used to provide the configurable switching, these operations may be performed as part of 802. Stated differently, where the layout of the optical system determines the configurable stitching, 804 may be performed as part of 802. If additional structures provide the configurable stitching, then 804 may be a separate step. For example, if jumpers and/or active switches are used, then these structures may be fabricated or used at 804. Fabrication of the optical system may be completed, at 806. In some embodiments, the optical system may be integrated with other wafer-scale devices at 806.

For example, optical system 100 may be provided using method 800. At 802, regions 130 may be provided using reticles 110-A and 110-B. Thus, ports 102 and 104 and local waveguides 140 may be fabricated. In some embodiments, the local waveguides for waveguide 140' may also be fabricated at 802. At 804, configurable connections 150 are formed. Fabrication of optical device 100 may be completed at 806. In some embodiments, optical device 100 is an interposer and 806 includes integrating interposer 800 with the desired wafer-scale device.

Thus, using method 800, optical systems, such as optical systems 100, 200, 200', 200", 300A, 300B, 300C, 400A, 400B, 400C, 500A, 500B, 600, 600', 700, 700', and/or 700" may be formed. Consequently, systems usable in providing the desired communication between regions of a wafer-scale device may be formed. Thus, the benefits described herein may be achieved.

Figure 9:
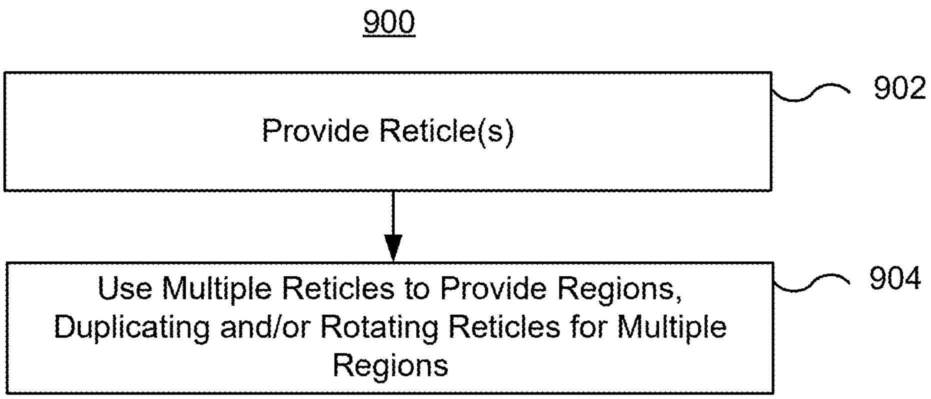
FIG. 9 is a flow chart depicting an embodiment of a method for providing devices having configurably stitched interconnects using multiple reticles and/or reticle configurations.

FIG. 9 is a flow chart depicting an embodiment of method 900 for providing optical systems having configurably stitched interconnects using multiple reticles and/or reticle configurations. Method 900 is described in the context of processes that may have sub-processes. Although described in a particular order, another order not inconsistent with the description herein may be utilized. For example, in some embodiments, portions of processes may be interleaved.

Reticles used in fabricating the optical system are provided, at 902. In some embodiments, the reticles are designed to provide a layout the achieves configurable stitching between at least some of the regions. Thus, some or all of the configurable stitching is provided by design of the regions. At 904, the reticle(s) are used in manufacturing the optical systems. As part of 904, the reticle(s) formed in 902 may be shifted and/or rotated (e.g. by one hundred and eighty degrees or through another appropriate angle) during use. The structures defined by the reticle(s), au this be fabricated/

For example, method 900 may be used to provide optical systems 400A, 400B, 400C, 500A, and/or 500B. Reticles used in optical systems 400A, 400B, or 400C may be provided, at 902. At 904, the reticles are used in fabricating optical system 400A, 400B, and/or 400C. Similarly, reticle 510 may be formed at 902. Reticle 510 may be used in forming optical systems 500A, and/or 500B at 904. As part of 904, reticle 510 may be shifted to form region 532 or shifted and rotated to form region 532R. Reticle 510 may then be shifted and/or rotated back to the original position to form region 534. Thus, structures such as local waveguides and ports may be formed based on the use of the reticles.

Thus, using method 900, optical systems, such as optical systems 100, 400A, 400B, 400C, 500A, 500B, and/or 700" may be formed. Consequently, systems usable in providing the desired communication between regions of a wafer-scale device may be formed. Thus, the benefits described herein may be achieved.

Figure 10:
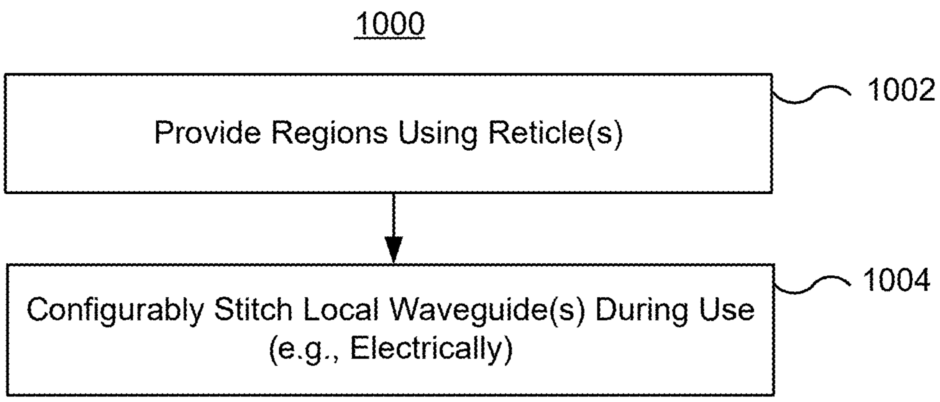
FIG. 10 is a flow chart depicting an embodiment of a method for providing devices having interconnects configurably stitched during use.

FIG. 10 is a flow chart depicting an embodiment of method 1000 for providing devices having interconnects configurably stitched during use. Method 1000 is described in the context of processes that may have sub-processes. Although described in a particular order, another order not inconsistent with the description herein may be utilized. For example, in some embodiments, portions of processes may be interleaved.

Regions of the optical system are fabricated using one or more reticles, at 1002. In some embodiments, 1002 includes forming active configurable connections. For example, optical switches and/or electrical switches may be formed. Thus, formation of the optical system may be completed at 1002. At 1004, the configurable connections are selectively enabled during use of the optical system. Thus, the connectivity between regions of the optical system, and thus the wafer-scale device with which the optical system is used, may be configured during use.

For example, method 1000 may be used to provide optical systems 300A, 300B, 300C, and/or 400B. Optical systems optical system 300A, 300B, 300C, and/or 400B may be provided, at 1002. For example, local waveguides 340 and/or 340C may be formed in optical devices 300A, 300B, and 300C. In addition, Mach-Zehnder switches 350A and 352A and/or micro-ring switches 350B and 352B may be formed at 1002. Similarly, local waveguides 440, 442B, 444B, 446B, 448B, and 449 may be provided at 1002. Electrical connections 450, 452, and 454 are also provided. At 1004, the active switches are selectively enabled. The desired connectivity across regions of optical systems 300A, 300B, 300C, and/or 400C may thus be provided.

Thus, using method 1000, optical systems, such as optical systems 300A, 300B, 300C, and/or 400B may be formed. Consequently, systems usable in providing the desired communication between regions of a wafer-scale device may be formed. Thus, the benefits described herein may be achieved.

Figure 11:
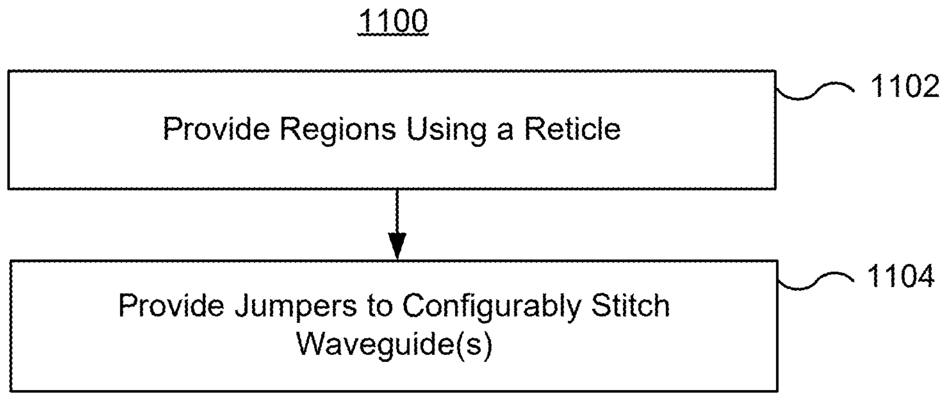
FIG. 11 is a flow chart depicting an embodiment of a method for providing devices having interconnects configurably stitched using jumpers.

FIG. 11 is a flow chart depicting an embodiment of method 1100 for providing optical systems having interconnects configurably stitched using jumpers. Method 1100 is described in the context of processes that may have sub-processes. Although described in a particular order, another order not inconsistent with the description herein may be utilized. For example, in some embodiments, portions of processes may be interleaved.

Regions of the optical system are fabricated using one or more reticles, at 1102. In some embodiments, 1102 includes forming local waveguides and ports such that the ports and/or local waveguides may be selectively added/dropped through the use of jumpers. At 1104, the jumpers are provided. Thus, connections are made that bypass some components and select others. Fabrication of the optical system may be completed and the optical system may be used.

For example, method 1100 may be used to provide optical systems 600 and/or 600'. Part of regions 630 and 530' may be formed, at 1102. Thus, local waveguides 640 and 640' and ports 602 and 604 may be formed. At 1104, jumpers 650 and/or 652 are provided. Thus, the desired configuration for interconnection between local waveguides 640 and 640' across multiple regions 630 and/or 630' may be achieved.

Thus, using method 1100, optical systems, such as optical systems 600 and/or 600' may be formed. Consequently, systems usable in providing the desired communication between regions of a wafer-scale device may be formed. Thus, the benefits described herein may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical system, comprising:

a plurality of regions, each of the plurality of regions defined by a reticle and including a local waveguide;

wherein the local waveguide of a region is configurably stitched to a remote waveguide on an other region of the plurality of regions; and wherein an electrical switch configurably stitches the local waveguide of the region to the remote waveguide on the other region of the plurality of regions.

2. The optical system of claim 1, wherein the configurably stitching includes at least one of active optical switching, waveguide path offsets, reticle offsets, jumpers, electrical switching, and multiple reticles.

3. The optical system of claim 1, wherein the region includes a plurality of local waveguides, the local waveguide being included in the plurality of local waveguides, the plurality of local waveguides being configurably stitched such that each of the plurality of regions is optically connected with at least one remaining region of the plurality of regions.

4. The optical system of claim 3, wherein each of the plurality of regions includes a plurality of ports and the plurality of local waveguides is configurably stitched such that the plurality of ports in the region are optically connected with a port in at least a portion of the at least one remaining region of the plurality of regions.

5. The optical system of claim 1, wherein the region further includes at least one of an optical input subsystem or an optical output subsystem coupled with the local waveguide, the optical input subsystem including an optical input and a first optical switch, the optical output subsystem including an optical output and a second optical switch.

6. The optical system of claim 5, wherein the first optical switch includes a first Mach-Zehnder switch or a first optical micro-ring and wherein the second optical switch includes a second Mach-Zehnder switch or a second optical micro-ring.

7. The optical system of claim 1, wherein a first portion of the plurality of regions is formed by a first reticle and a second portion of the plurality of regions is formed by a second reticle different from the first reticle.

8. An optical system, comprising:

a plurality of regions, each of the plurality of regions defined by a reticle and including a local waveguide;

wherein the local waveguide of a region is configurably stitched to a remote waveguide on an other region of the plurality of regions;

wherein each of the plurality of regions includes a plurality of local waveguides, a first side, a second side opposite to the first side, and a third side, the local waveguide being included in the plurality of local waveguides, the plurality of local waveguides having waveguide path offsets such that a portion of each of the plurality of local waveguides proximate the first side is closer to the third side than an opposite portion of each of the plurality of local waveguides proximate the second side is.

9. The optical system of claim 8, wherein the opposite portion of each of the plurality of local waveguides in the region is aligned with the portion of each of the plurality of local waveguides in the other region.

10. The optical system of claim 8, wherein at least a portion of the plurality of local waveguides are coupled with at least one port.

11. An optical system, comprising:

a plurality of regions, each of the plurality of regions defined by a reticle and including a local waveguide;

wherein the local waveguide of a region is configurably stitched to a remote waveguide on an other region of the plurality of regions;

wherein each of the plurality of regions includes a plurality of local waveguides, a first side, a second side opposite to the first side, a portion of each of the plurality of local waveguides being proximate the first side, an opposite portion of each of the plurality of local waveguides proximate the second side; and wherein the reticle used in forming the region and the other region is offset for the other region such that the opposite portion of each of the plurality of local waveguides in the region is aligned with the portion of each of the plurality of local waveguides in the other region.

12. An optical system, comprising:

a plurality of regions, each of the plurality of regions defined by a reticle and including a local waveguide;

wherein the local waveguide of a region is configurably stitched to a remote waveguide on an other region of the plurality of regions;

wherein each of the plurality of regions includes a plurality of ports and a plurality of local waveguide segments; and wherein a one-shot jumper configurably couples a waveguide segment to a port or an other waveguide segment.

13. An optical system, comprising:

a plurality of regions, each of the plurality of regions defined by a reticle and including a plurality of local waveguides and a plurality of ports;

wherein a local waveguide of a region is configurably stitched to a remote waveguide on at least one other region of the plurality of regions such that each of the plurality of regions is optically connected with each remaining region of the plurality of regions and such that at least a portion of the plurality of ports in each of the plurality of regions is optically connected with a second port of each the at least one remaining region of the plurality of regions;

wherein an electrical switch configurably stitches the local waveguide of the region to the remote waveguide on the at least other region of the plurality of regions.

14. The optical system of claim 13, wherein the configurably stitching includes at least one of active optical switching, waveguide path offsets, reticle offsets, jumpers, electrical switching, and multiple reticles.

15. A method for providing an optical system, comprising:

providing a plurality of regions, each of the plurality of regions defined by a reticle and including a local waveguide;

wherein the local waveguide of a region is configurably stitched to a remote waveguide on an other region of the plurality of regions and such that each of the plurality of regions is optically connected with each remaining region of the plurality of regions, wherein the providing the plurality of regions further includes:

providing an electrical switch that configurably stitches the local waveguide of the region to the remote waveguide on the other region of the plurality of regions.

16. The method of claim 15, wherein providing the plurality of regions further includes:

providing at least one of an optical input subsystem or an optical output subsystem coupled with the local waveguide, the optical input subsystem including an optical input and a first optical switch, the optical output subsystem including an optical output and a second optical switch, the first optical switch and the second optical switch being electrically controlled.

17. The method of claim 15, wherein the providing the plurality of regions further includes:

providing a first portion of the plurality of regions using a first reticle; and providing a second portion of the plurality of regions using a second reticle different from the first reticle.

18. The method of claim 15, wherein the configurably stitching includes at least one of active optical switching, waveguide path offsets, reticle offsets, jumpers, electrical switching, and multiple reticles.

19. A method for providing an optical system, comprising:

providing a plurality of regions, each of the plurality of regions defined by a reticle and including a local waveguide;

wherein the local waveguide of a region is configurably stitched to a remote waveguide on an other region of the plurality of regions and such that each of the plurality of regions is optically connected with each remaining region of the plurality of regions;

wherein each of the plurality of regions includes a plurality of local waveguides, a first side, a second side opposite to the first side, and a third side, the local waveguide being included in the plurality of local waveguides, the plurality of local waveguides having waveguide path offsets such that a portion of each of the plurality of local waveguides proximate the first side is closer to the third side than an opposite portion of each of the plurality of local waveguides proximate the second side is; and wherein the opposite portion of each of the plurality of local waveguides in the region is aligned with the portion of each of the plurality of local waveguides in the other region.

20. A method for providing an optical system, comprising:

providing a plurality of regions, each of the plurality of regions defined by a reticle and including a local waveguide;

wherein the local waveguide of a region is configurably stitched to a remote waveguide on an other region of the plurality of regions and such that each of the plurality of regions is optically connected with each remaining region of the plurality of regions;

wherein each of the plurality of regions includes a plurality of local waveguides, a first side, a second side opposite to the first side, a portion of each of the plurality of local waveguides being proximate the first side, an opposite portion of each of the plurality of local waveguides proximate the second side; and wherein the providing the plurality of regions further includes:

providing a first region using the reticle;

offsetting the reticle to form the other region such that the opposite portion of each of the plurality of local waveguides in the region is aligned with the portion of each of the plurality of local waveguides in the other region; and forming the other region.

21. A method for providing an optical system, comprising:

providing a plurality of regions, each of the plurality of regions defined by a reticle and including a local waveguide;

wherein the local waveguide of a region is configurably stitched to a remote waveguide on an other region of the plurality of regions and such that each of the plurality of regions is optically connected with each remaining region of the plurality of regions, and wherein the providing the plurality of regions further includes:

providing a plurality of ports and a plurality of local waveguide segments in each of the plurality of regions using the reticle; and providing a one-shot jumper for the region, the one-shot jumper configurably coupling a waveguide segment to a port or an other waveguide segment.

* * * * *